(12) United States Patent
Kawabe

(10) Patent No.: US 9,846,480 B2
(45) Date of Patent: Dec. 19, 2017

(54) SELECTING METHOD, COMPUTER PRODUCT, SELECTING APPARATUS, AND RECORDING MEDIUM

(71) Applicant: FUJITSU LIMITED, Kawasaki-shi, Kanagawa (JP)

(72) Inventor: Yukihito Kawabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 15/016,456

(22) Filed: Feb. 5, 2016

(65) Prior Publication Data

US 2016/0154455 A1    Jun. 2, 2016

Related U.S. Application Data

(63) Continuation of application No. PCT/JP2013/071568, filed on Aug. 8, 2013.

(51) Int. Cl.
G06F 1/32    (2006.01)

(52) U.S. Cl.
CPC ............ G06F 1/3296 (2013.01); G06F 1/324 (2013.01); G06F 1/3206 (2013.01); G06F 1/329 (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS

2004/0225902 A1    11/2004  Cesare et al.
2006/0064679 A1    3/2006   Ozaki
(Continued)

FOREIGN PATENT DOCUMENTS

JP    2006-059068    3/2006
JP    2006-524374    10/2006
(Continued)

OTHER PUBLICATIONS

David Brooks et al., "Wattch: A Framework for Architectural-Level Power Analysis and Optimizations", ISCA, Jun. 2000, pp. 83-94 (12 pages).
(Continued)

*Primary Examiner* — Zahid Choudhury
(74) *Attorney, Agent, or Firm* — Fujitsu Patent Center

(57) ABSTRACT

A selecting method includes obtaining by a computer, for each operation state combination for a processor of which element operation states are changeable, a state information record indicating operation states of the operation state combination; measuring by the computer, for each obtained state information record, a power consumption value and a processing performance value of the processor after the processor is switched to the operation states indicated by the state information record, the power consumption value and the processing performance value being measured by executing a specific program on the processor after the processor is switched to the operation states indicated by the state information record; and selecting by the computer, based on the measured processing performance values and for each predetermined power consumption value, a state information record for which the measured power consumption value is the predetermined power consumption value or less among the obtained state information records.

14 Claims, 20 Drawing Sheets

(52) U.S. Cl.
CPC .......... *G06F 1/3237* (2013.01); *G06F 1/3275* (2013.01); *G06F 1/3287* (2013.01); *Y02B 60/1217* (2013.01); *Y02B 60/1221* (2013.01); *Y02B 60/1228* (2013.01); *Y02B 60/1282* (2013.01); *Y02B 60/144* (2013.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 2007/0043960 A1 | 2/2007 | Bose et al. | |
| 2007/0277046 A1 | 11/2007 | Yasuda et al. | |
| 2009/0187776 A1 | 7/2009 | Baba et al. | |
| 2009/0276644 A1 | 11/2009 | Goodnow et al. | |
| 2010/0014848 A1* | 1/2010 | Guthrie | G03B 7/26 396/205 |
| 2011/0252260 A1* | 10/2011 | Flachs | G06F 1/3287 713/324 |
| 2012/0005513 A1* | 1/2012 | Brock | G06F 1/3203 713/340 |

FOREIGN PATENT DOCUMENTS

| | | |
|---|---|---|
| JP | 2007-317054 | 12/2007 |
| JP | 2009-505279 | 2/2009 |
| JP | 2009-175788 | 8/2009 |
| JP | 2010-61278 | 3/2010 |

OTHER PUBLICATIONS

Yasuko Eckert et al., "Something Old and Something New:P-states can Borrow Microarchitecture Techniques Too", ISLPED, Jul.-Aug. 2012 (6 pages).

International Search Report, mailed in connection with PCT/JP2013/071568 and dated Nov. 12, 2013 (2 pages).

* cited by examiner

FIG.2

| PRIMARY CACHE | SECONDARY CACHE | | |
|---|---|---|---|
| 4 | 3 | ... | 111 |
| 3 | 3 | ... | 111-A |
| 4 | 2 | ... | 111-B |
| 3 | 2 | ... | 111-C |
| 2 | 2 | ... | 111-D |
| 2 | 1 | ... | 111-E |
| 1 | 1 | ... | 111-F |
| ... | ... | ... | 111-G |

| POWER CONSUMPTION VALUE | PROCESSING PERFORMANCE VALUE |
|---|---|
| 95 | 100 |
| 75 | 80 |
| 60 | 40 |
| 50 | 35 |
| 20 | 10 |
| 17 | 5 |
| 10 | 2 |
| ... | ... |

CORRECTED PROCESSING PERFORMANCE VALUE (SPECIFIED POWER CONSUMPTION VALUE=55)
=100×(55/95)=57.9
=80×(55/75)=58.7
=40×(55/60)=36.7

100

200

| SPECIFIED POWER CONSUMPTION VALUE | STATE INFORMATION | FREQUENCY |
|---|---|---|
| 95 | A | f0 |
| 75 | B | f0 |
| 55 | B | f1 |
| 35 | B | f2 |
| ... | ... | ... |

FIG.6

| COMPUTING PIPELINE COUNT | PRIMARY CACHE WAY COUNT | - | INSTRUCTION ISSUE WIDTH | - | MIB ENTRY COUNT | - | |
|---|---|---|---|---|---|---|---|
| 4 | 2 | ... | 4 | ... | 8 | ... | ← 601-A |
| 2 | 4 | ... | 3 | ... | 16 | ... | ← 601-B |
| 1 | 4 | ... | 2 | ... | 16 | ... | ← 601-C |
| 2 | 4 | ... | 2 | ... | 24 | ... | ← 601-D |
| .. | .. | .. | .. | .. | .. | .. | .. |

| | STATE INFORMATION | | | | | | MEASUREMENT RESULT | | |
|---|---|---|---|---|---|---|---|---|---|
| | COMPUTING PIPELINE COUNT | PRIMARY CACHE WAY COUNT | - | INSTRUCTION ISSUE WIDTH | - | MIB ENTRY COUNT | - | DYNAMIC POWER VALUE | STATIC POWER VALUE | PROCESSING PERFORMANCE VALUE |
| 601-A | 4 | 2 | ⋮ | 4 | ⋮ | 8 | ⋮ | 15 | 10 | 4 |
| 601-B | 2 | 4 | ⋮ | 3 | ⋮ | 16 | ⋮ | 12 | 8 | 3.8 |
| 601-C | 1 | 4 | ⋮ | 2 | ⋮ | 16 | ⋮ | 11 | 9 | 3.5 |
| 601-D | 2 | 4 | ⋮ | 2 | ⋮ | 24 | ⋮ | 9 | 8 | 3 |
| ⋮ | ⋮ | ⋮ | ⋮ | ⋮ | ⋮ | ⋮ | ⋮ | ⋮ | ⋮ | ⋮ |

| SPECIFIED POWER CONSUMPTION VALUE | FREQUENCY | STATE INFORMATION | |
|---|---|---|---|
| P0 | f0 | INI | 1001-0 |
| P1 | f0 | A | 1001-1 |
| P2 | f0 | D | 1001-2 |
| P3 | f0 | F | 1001-3 |
| P4 | f0 | G | 1001-4 |
| P5 | f0 | H | 1001-5 |

1000

SELECTING METHOD, COMPUTER PRODUCT, SELECTING APPARATUS, AND RECORDING MEDIUM

CROSS REFERENCE TO RELATED APPLICATIONS

This application is a continuation application of International Application PCT/JP2013/071568, filed on Aug. 8, 2013 and designating the U.S., the entire contents of which are incorporated herein by reference.

FIELD

The embodiments discussed herein are related to a selecting method, a computer product, a selecting apparatus, and a recording medium.

BACKGROUND

Conventionally, to facilitate lower processor power consumption, techniques of controlling the frequency of clock signals supplied to the processor are commonly known (for example, refer to Japanese Laid-Open Patent Publication No. 2007-317054). Further, to facilitate lower processor power consumption, techniques of controlling the value of supply voltage and the frequency of clock signals supplied to the processor are commonly known (for example, refer to Japanese Laid-Open Patent Publication No. 2009-175788).

A technique of facilitating lower power consumption of a virtual server system is commonly known where a management apparatus of the virtual server system uses server hardware information and virtual server information built on a server to search for a virtual server suitable as a resource for the central processing unit (CPU) core count and memory capacity (for example, refer to Japanese Laid-Open Patent Publication No. 2010-61278).

Another technique is commonly known where power consumption values and processing performance values for a processor are estimated by simulation (for example, refer to David Brooks, et al, "Wattch: A Framework for Architectural-Level Power Analysis and Optimizations", ISCA, 2000, p. 83-94).

Further, it is commonly known that when the operation states of processor elements change, power consumption lower than that by dynamic frequency scaling (DFS) performed to control frequency may be facilitated (for example, refer to Yasuko Eckert, et al, "Something Old and Something New: P-states can Borrow Microarchitecture Techniques Too", ISLPED, 2012).

Nonetheless, in program execution, when conditions for processor power consumption values are set, a problem arises in that selection of an operation state by which the processor satisfies the conditions and by which processing performance is increased is difficult.

SUMMARY

According to an aspect of an embodiment, a selecting method includes obtaining by a computer, for each operation state combination for a processor of which element operation states are changeable, a state information record that indicates operation states of the operation state combination; measuring by the computer, for each obtained state information record, a power consumption value and a processing performance value of the processor after the processor is switched to the operation states indicated by the state information record, the power consumption value and the processing performance value being measured by executing a specific program on the processor after the processor is switched to the operation states indicated by the state information record; and selecting by the computer, based on the measured processing performance values and for each predetermined power consumption value among plural predetermined power consumption values that differ, a state information record for which the measured power consumption value is the predetermined power consumption value or less among the obtained state information records.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting a second operation example of the selecting apparatus;

FIG. 6 is a diagram depicting a state list example;

FIG. 8 is a diagram depicting an example of a state list in which state information includes measurement results;

FIG. 10 is a diagram depicting an example of a control mode table;

DESCRIPTION OF EMBODIMENTS

Embodiments of a selecting method, a selecting program, a selecting apparatus, and a recording medium will be described in detail with reference to the accompanying drawings.

Figure 1:
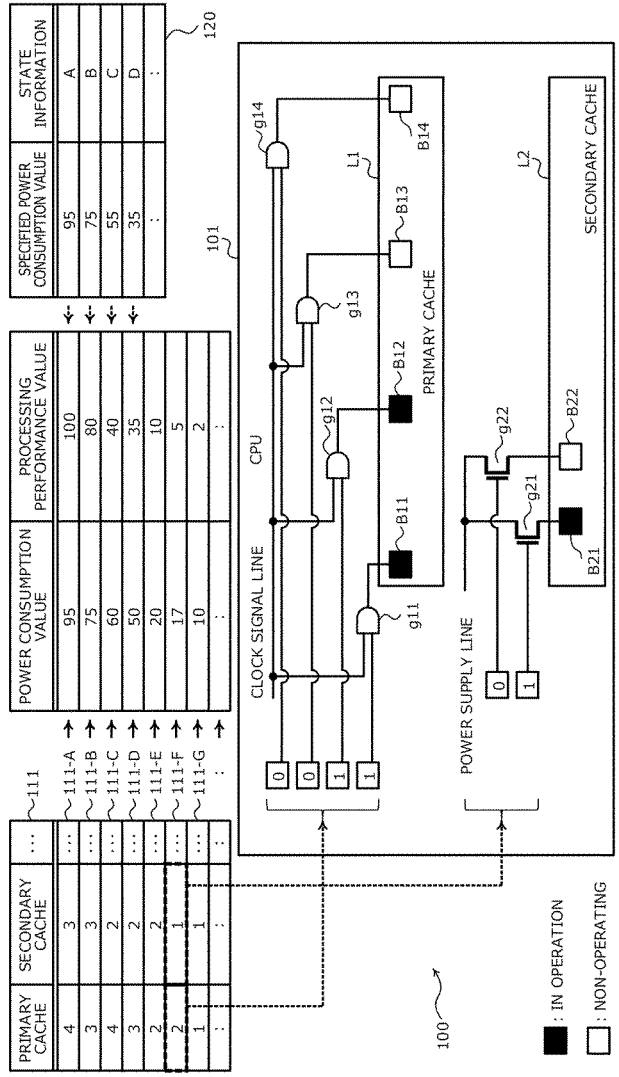
FIG. 1 is a diagram depicting a first operation example of a selecting apparatus according to the disclosure.

FIG. 1 is a diagram depicting a first operation example of the selecting apparatus according to the disclosure. A selecting apparatus 100 is a computer that generates a table for providing operation states of processor elements such that in the execution of a program by a processor, an upper limit for a power consumption value is satisfied and the processing performance raised. Here, the processor, for example, is a CPU 101 depicted in FIG. 1, capable of changing the operation state of each element. The elements of the CPU 101, for example, are a primary cache L1, a secondary cache L2, and further elements related to instruction execution of a computation device such as that depicted in FIG. 1. Changing of the operation state of elements such as the primary cache L1 and the secondary cache L2 depicted in FIG. 1, for instance, is changing as changeable cache way counts, a count of the blocks to be operated among plural blocks that correspond to ways included in caches. More specifically, for example, the CPU 101 has a configuration register for the frequency and state information 111 indicating operation states, and the operation state of the CPU 101 can be changed to the operation state indicated by the state information 111 set in the register. Further, the frequency of a clock supplied to the elements of the CPU 101 can be changed to the frequency set in the register. The CPU 101 may be the CPU 101 of the selecting apparatus 100, or may be the CPU 101 of another apparatus whose operation state can be changed by the selecting apparatus 100.

For each operation state combination for the CPU 101 whose operation states are changeable, the selecting apparatus 100 obtains the state information 111 that indicates the operation states. More specifically, the state information 111 indicates combinations of element operation states. The operation state combinations, for example, are obtained by simulation seeking operation states suitable for a specific program, based on a power consumption value, a processing performance value, etc. The specific program, for example, is a program prepared for execution by the CPU 101, and may be a program of an actual application. Further, the specific program may be of various types. A detailed example will be described hereinafter.

As depicted in FIG. 1, taking the state information 111-F as an example, when the CPU 101 is changed to the operation states indicated by the state information 111-F, among the four blocks B11 to B14 of the primary cache L1 in the CPU 101, the block B11 and the block B12 are in operation, the block B13 and the block B14 are non-operating. Among the two blocks B21 and B22 of the secondary cache L2 in the CPU 101, the block B21 is in operation, while the block B22 is non-operating. In the example of the primary cache L1 depicted in FIG. 1, clock gating elements g11 to g14 capable of switching whether a clock signal is to be supplied are respectively disposed between a clock signal line and a block of the primary cache L1. The CPU 101 controls the clock gating elements g11 to g14, thereby enabling control of the switching. In the example of the secondary cache L2 depicted in FIG. 1, power gating elements g21 and g22 capable of switching whether power is to be supplied are disposed respectively between a power supply line and a block of the secondary cache L2. The CPU 101 controls the power gating elements g21 and g22, thereby enabling the switching to be controlled. Thus, the operation state of each element is changed.

Subsequently, for each obtained record of the state information 111, the selecting apparatus 100 causes the CPU 101, whose operation state has been changed to that indicated by the state information 111, to execute a specific program for a given period and thereby, measures the power consumption value and the processing performance value of the CPU 101 after the change. The given period is a period of time sufficient for routinely obtaining a performance value and power consumption value, and for example, is specified by the user. For example, a circuit capable of measuring the power consumption value and the processing performance value is disposed in the CPU 101 in advance whereby, measurement is performed by an execution of the specific program. Further, the processing performance value, for example, is a million instructions per second (MIPS) value and in the case of a MIPS value, the greater the value is, the higher the processing performance is indicated to be. Further, the power consumption value may be measured distinguishing dynamic power values and static power values of consumption consequent to leak currents.

For each predetermined power consumption value among predetermined power consumption values that differ, the selecting apparatus 100 selects from among the obtained state information 111 and based on the measured processing performance values, the state information 111 by which the measured power consumption value becomes the predetermined power consumption value or less. More specifically, the selecting apparatus 100 obtains plural specified power consumption values that differ. The plural specified power consumption values are values that differ for each given range between a smallest value and a greatest value. The smaller the interval of the given range is, the greater the count of the specified power consumption values is. A predetermined power consumption value may be a specified power consumption value itself, or may be a value that is a specified power consumption value to which a margin of error has been added. In the example depicted in FIG. 1, a predetermined power consumption value is assumed to be a value that is a specified power consumption value to which a margin of error is added. Here, for example, a predetermined power consumption value is assumed to be a value obtained by adding a specified power consumption value and a margin of error, where the margin of error is assumed to be 5. In the example depicted in FIG. 1, the specified power consumption values are values differing by increments of 20.

For example, when the specified power consumption value is 95, the predetermined power consumption value is 100 and therefore, the state information 111-A is selected as the state information 111 by which the measured power consumption value becomes the predetermined power consumption value or less and by which the processing performance is the highest. For example, when the specified power consumption value is 75, the predetermined power consumption value is 80 and therefore, the state information 111-B is selected as the state information 111 by which the measured power consumption value becomes the predetermined power consumption value or less and the processing performance is the highest. For example, when the specified power consumption value is 55, the predetermined power consumption value is 60 and therefore, the state information 111-C is selected as the state information 111 by which the measured power consumption value becomes the predetermined power consumption value or less and the processing performance is the highest.

The selecting apparatus 100 creates a table 120 associating each respective specified power consumption value and the state information 111 selected for the specified power consumption value. As a result, during operation, an operation state can be switched to that which has high processing performance and satisfies a condition for the actual power consumption value. The condition for the power consumption value, for example, is a condition related to an upper limit of the power consumption value.

Further, the selecting apparatus 100 according to the first operation example enables improved power efficiency compared to DFS. DFS is a technique of lowering power consumption by lowering the frequency of the CPU during program execution. Dynamic voltage and frequency scaling (DVFS) is a similar technique. DVFS is a technique that in addition to DFS, lowers operation voltage by a timing leeway occurring consequent to the lowering of the frequency and thereby, further lowers power consumption. Power efficiency is the processing volume per unit of power consumed.

The processing performance of the CPU 101 is proportional to the frequency of the clock signal and therefore, in power consumption control using DFS or DVFS, to reduce power consumption to the same extent, power should be reduced as much as possible without reducing the frequency. Under DFS, frequency alone is controlled and the source voltage is not changed. Therefore, among power consumption values, the dynamic power value alone decreases in proportion to frequency. In contrast, DVFS further lowers the source voltage according to frequency and therefore, the dynamic power value changes by an amount equivalent to the frequency raised to about the third power. Further, with advances in technology to reduce wiring widths and gate widths, when the power source voltage value is lowered by the drain induced barrier lowering (DIBL) effect and the like, leak current also decreases whereby, not only the dynamic power value, but the static power value also decreases by about the same power order. Therefore, DVFS is more efficient than DFS and enables the power consumption value to be reduced.

On the other hand, as reduced scaling advances, the minimum transistor operating voltage value cannot be lowered consequent to limits of technology scaling. Further, minimum voltage values guaranteeing operation of random access memory (RAM) macros, analog macros, etc. implemented on integrated semiconductor circuits cannot be lowered like minimum voltage values guaranteeing operation of digital circuits. Therefore, the range of frequency that can be controlled by DVFS is narrow. Further, compared to frequency, the control of power source voltage values is complicated, and a large amount of time is required for control. Design and verification for guaranteeing operation when the power source voltage value is varied is more difficult than the design and verification for guaranteeing operation when the frequency is varied. Therefore, there are cases where power source voltage value control cannot be used as a means of controlling power consumption. In this regard, the selecting apparatus 100 according to the first operation example enables power efficiency to be improved compared to DFS, without changing the power source voltage value.

FIG. 2 is a diagram depicting a second operation example of the selecting apparatus. In the second operation example, an example of selecting the state information 111 differs the first operation example from depicted in FIG. 1; and with regard to measurement concerning the state information 111, the processing is the same and therefore, detailed description is omitted. Further, although the selecting apparatus 100 depicted in FIG. 1 and the selecting apparatus 100 depicted in FIG. 2 may be different apparatuses, the hardware configuration and the like may be the same and therefore, the same reference numerals are used herein. For each of the plural specified power consumption values which differ, the selecting apparatus 100 selects the state information 111 from among the obtained state information 111, based on a processing performance value that is the measured processing performance that has been corrected based on a rate of the measured processing performance value and the specified power consumption value. Further, the selecting apparatus 100 selects the state information 111 that indicates the operation state for which the processing performance of the CPU 101 indicated by the corrected processing performance value is the highest. More specifically, the selecting apparatus 100 corrects the measured processing performance value by the "measured processing performance value× (specified power consumption value/measured power consumption value)".

Here, for example, the frequency at the time of measuring is regarded as the highest frequency that can be configured and although this frequency can be configured to be lower than the frequency at the time of measuring, it is assumed that the frequency cannot be configured to be higher than the frequency at the time of measuring. As depicted in FIG. 2, in taking a case where the specified power consumption value is 55 as an example, the corrected processing performance value for the state information 111-A is "100×(55/95)", or 57.9. The corrected processing performance value for the state information 111-B is "80×(55/75)", or 58.7. The corrected processing performance value for the state information 111-C is "40×(55/60)", or 36.7. Concerning the state information 111-D to the state information 111-E, when the processing performance represented by the processing performance value is lower than that of the state information 111-C and the frequency is not raised, processing performance value cannot be corrected and therefore, is excluded from being subject to correction. In the example depicted in FIG. 1, as described above, when the processing performance value is an MIPS value, the selecting apparatus 100, in a case where the specified power consumption value is 55, selects the state information 111-B for which the corrected processing performance value is the greatest. More specifically, when the power consumption value is measured distinguishing dynamic power values and static power values that are leak current values, "dynamic power value/ (specified power consumption value−static power value)" is regarded as the rate. A detailed example in this case will be described hereinafter.

The selecting apparatus 100, for each of the plural specified power consumption values, corrects the frequency when the power consumption value and the processing performance value are measured, based on the rate concerning the selected state information 111.

In this manner, even when there is no state information 111 by which the measured power consumption value becomes close to the specified power consumption value, if the frequency can be changed, the frequency is changed, enabling the state information 111 that raises processing performance to be selected. The selecting apparatus 100 generates a table 200 that associates each specified power consumption value, the state information 111 selected with respect to the specified power consumption value, and the corrected frequency. As a result, an operation state that has high processing performance and satisfies the upper limit of the actual power consumption can be selected. Further, the selecting apparatus 100 according to the second operation example enables improved power efficiency as compared to DFS.

Figure 3:
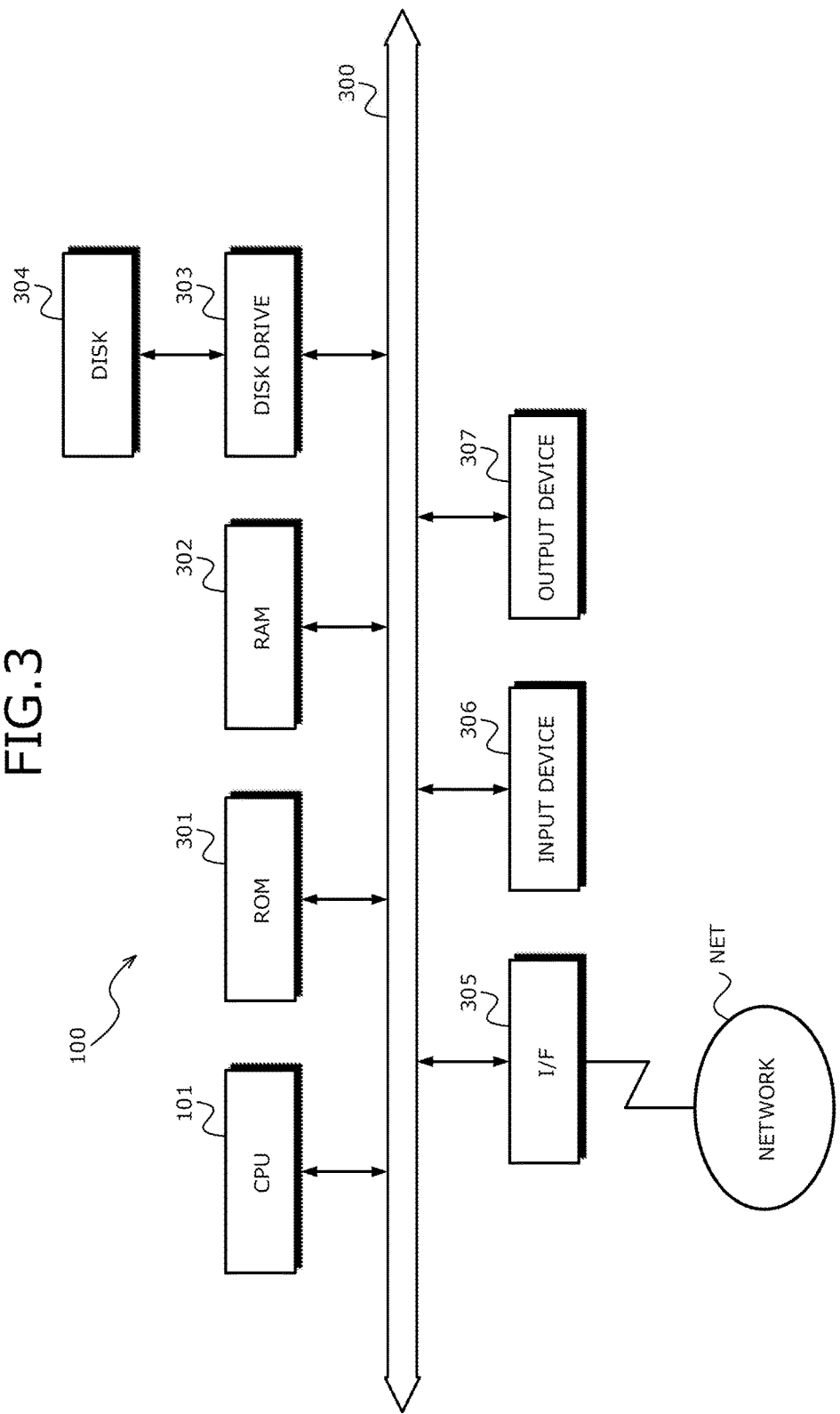
FIG. 3 is a block diagram depicting an example of hardware configuration of the selecting apparatus according to an embodiment.

FIG. 3 is a block diagram depicting an example of hardware configuration of the selecting apparatus according to an embodiment. In FIG. 3, the selecting apparatus 100 has the CPU 101, read-only memory (ROM) 301, RAM 302, a disk drive 303, and a disk 304. The selecting apparatus 100 further has an interface (I/F) 305, an input device 306, and an output device 307. The respective components are connected by a bus 300.

Here, the CPU 101 governs overall control of the selecting apparatus 100. The ROM 301 stores programs such as a boot program. The RAM 302 is used as a work area of the CPU 101. The disk drive 303, under the control of the CPU 101, controls the reading and writing of data with respect to the disk 304. The disk 304 stores data written thereto under the control of the disk drive 303. The disk 304 may be a magnetic disk, an optical disk, and the like.

The I/F 305 is connected through a communications line, to a network NET such as a local area network (LAN), a wide area network (WAN), and the Internet and is connected to other apparatuses via the network NET. The I/F 305 administers an internal interface with the network NET and controls the input and output of data from an external apparatus. The I/F 305, for example, may be a modem, a LAN adapter, and the like.

The input device 306 is an interface that inputs various types of data by user operation of a keyboard, a mouse, a touch panel, and the like. Further, the input device 306 can take in images and video from a camera. The input device 306 can further take in audio from a microphone. The output device 307 is an interface that outputs data consequent to an instruction of the CPU 101. The output device 307 may be a display, a printer, and the like.

Figure 4:
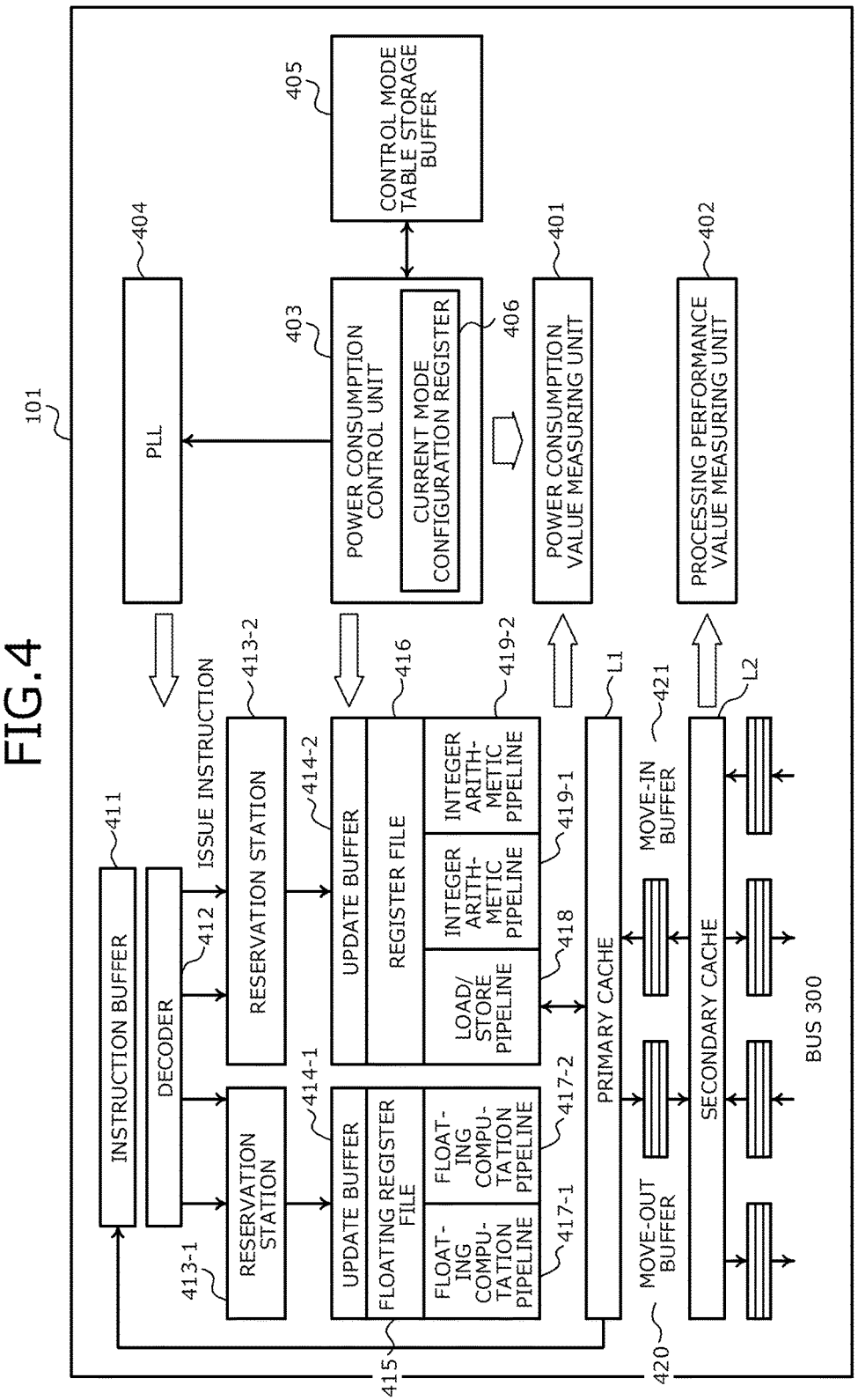
FIG. 4 is a diagram depicting a detailed example of a CPU.

FIG. 4 is a diagram depicting a detailed example of the CPU. In the example depicted in FIG. 4, the CPU 101 has elements such as an instruction buffer 411, a decoder 412, a reservation station 413, an update buffer 414, a floating register file 415, a register file 416, etc. Further, the CPU 101 further has elements such as various types of computation pipelines 417 to 419, the primary cache L1, the secondary cache L2, a move-out buffer 420, a move-in buffer 421, and the like. The CPU 101 can change operation states based on state information. More specifically, the CPU 101 has the elements, a phase locked loop (PLL) 404 supplying a clock signal to each element, a power consumption control unit 403, a power consumption value measuring unit 401, a control mode table storage buffer 405, and a processing performance value measuring unit 402. The PLL 404 has the frequency of the clock signal adjusted by the power consumption control unit 403. The control mode table storage buffer 405 stores a control mode table generated in the present embodiment. In the embodiment, although an example will be given where the control mode table storage buffer 405 is provided in the CPU 101, without limitation hereto, the control mode table storage buffer 405 may be a storage apparatus external from the CPU 101, such as the RAM 302 and the disk 304. Details of the power consumption control unit 403, the power consumption value measuring unit 401, and the processing performance value measuring unit 402 will be described hereinafter.

Further, for example, a clock gating element capable of switching whether a clock signal is to be supplied to a portion of the elements is disposed on the respective clock signal lines of the portion of the elements and under the control of the CPU 101, the clock gating element changes the operation state of the elements. Further, for example, a power gating element capable of switching whether power is to be supplied to a portion of the elements from a power supply circuit is disposed on the respective power supply lines of the blocks and under the control of the CPU 101, the power gating element changes the operation state of the elements.

Figure 5:
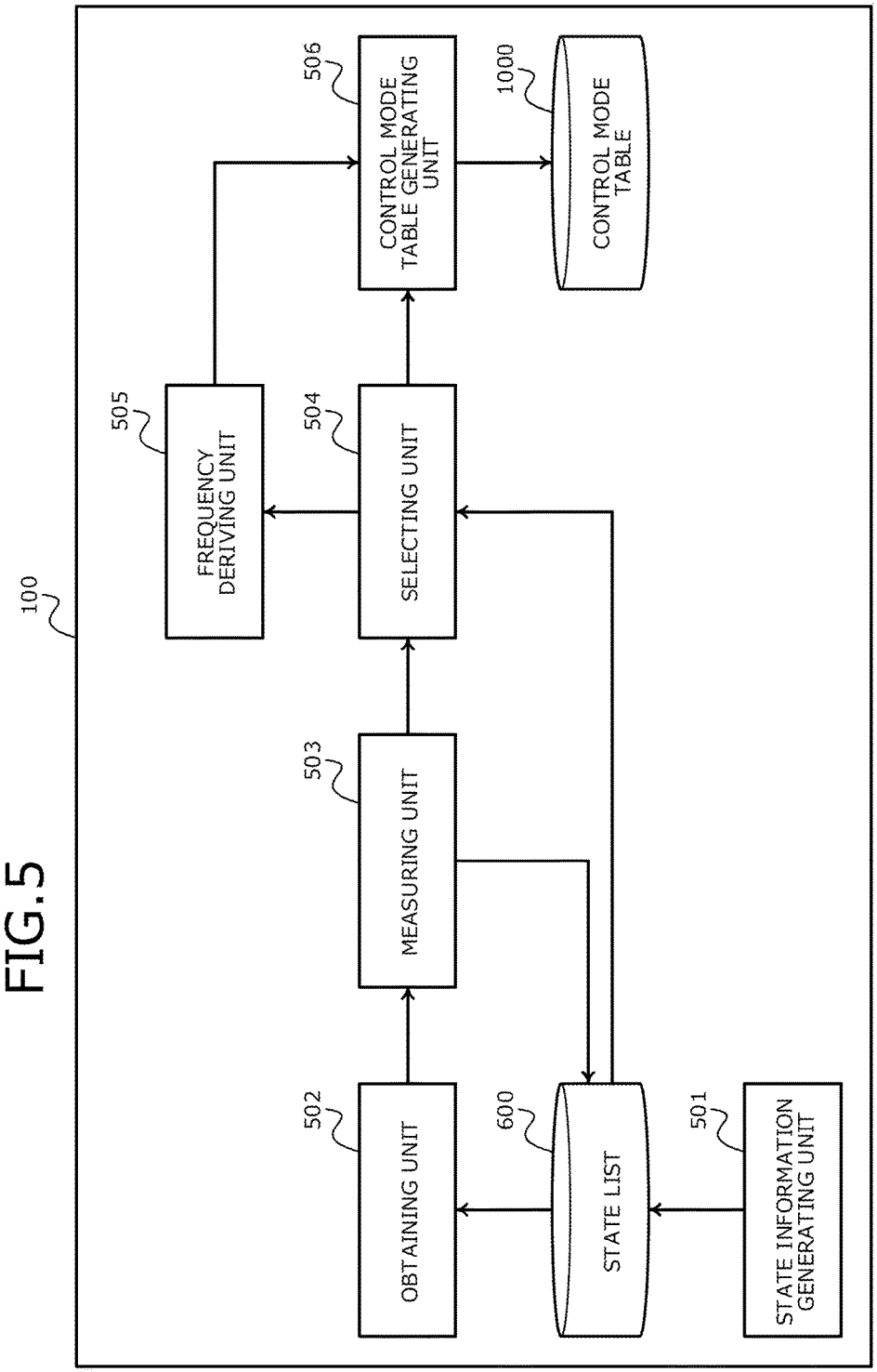
FIG. 5 is a block diagram depicting an example of a functional configuration of the selecting apparatus.

FIG. 5 is a block diagram depicting an example of a functional configuration of the selecting apparatus. The selecting apparatus 100 has a control unit including a state information generating unit 501, an obtaining unit 502, a measuring unit 503, a selecting unit 504, a frequency deriving unit 505, a control mode table generating unit 506. Processes of the control unit (the measuring unit 503 to the control mode table generating unit 506), for example, are coded in a selecting program stored in a storage apparatus accessible by the CPU 101. The CPU 101 reads out an information processing program from the storage apparatus, and executes a coded process in the selecting program whereby processes of each unit are executed. Furthermore, process results of the control unit (the measuring unit 503 to the control mode table generating unit 506), for example, are stored to a storage apparatus such as the RAM 302 and the disk 304.

Concerning the present invention, description of a selecting process by the selecting unit 504 will be divided into first and second examples that differ. In the first example, state information by which the measured power consumption value becomes a specified power consumption value or less is selected from plural state information records. In the second example, state information by which the processing performance value that is the measured processing performance value corrected by the measured power consumption value and the specified power consumption value becomes the highest is selected from plural state information records. In the first example, details of the first operation example depicted in FIG. 1 described above are used and in the second example, details of the second operation example depicted in FIG. 2 described above are used. Further, a process by the frequency deriving unit 505 is a process performed in the second example and is not a process performed in the first example.

In the first example, for each operation state, a processing performance value and a power consumption value of the CPU 101 are measured. Further, in the first example, operation states by which performance that takes plural given power values respectively as upper limits is high are selected based on the measurement results. As a result, for each power value upper limit, an operation state having high processing performance can be specified during operation.

The state information generating unit 501 obtains state information that indicates the specified operation state of the CPU 101. The specified operation state is an operation state used as a reference. State information indicating the specified operation state will be referred to as the specified state information.

The state information generating unit 501 obtains by simulation, a specified processing performance value for a case when in the specified operation state, the CPU 101 has executed a specific program. The simulation here, for example, suffices to use the simulation technique above described in non-patent literature by David Brooks, et al, "Wattch: A Framework for Architectural-Level Power Analysis and Optimizations", ISCA, 2000, p. 83-94.

The state information generating unit 501, for each lower limit processing performance value among plural lower limit processing performance values that differ and are within a given range, simulates a case where the CPU 101 has executed the specific program. As a result, the state information generating unit 501 generates from an operation state by which the processing performance value becomes a lower limit processing performance value or greater, state information that indicates the operation state by which the power consumption value becomes the lowest. The given range, for example, is a range from the specified processing performance value to the lowest processing performance value. The lowest processing performance value is defined by the user and is pre-stored to a storage apparatus such as the RAM 302 and the disk 304. Further, the specific program uses a program for which power is adjusted by the generated control mode table and thereby, generates an operation state by which power efficiency becomes high for the program. Further, without using a program that is subject to adjustment, for example, programs having a characteristic related to the use of an element of the CPU 101, such as a program with an emphasis on integer arithmetic, a program with emphasis on floating-point arithmetic, a program with emphasis on cache access, and a program with emphasis on memory access may be used. In this case, among these programs, a program similar to the program executed by the measuring unit 503 and the utilization state of an element is used and in the generated operation state, the power efficiency is high. The specific program is pre-stored to a storage apparatus such as the RAM 302 and the disk 304.

More specifically, the state information generating unit 501 obtains for the CPU 101, the operation state by which power consumption is minimized based on a lower limit performance constraint within a range of all operation states obtained as combinations of possible values that the elements can take on. The obtained solution may be an approximate solution. The range of values that the elements can take on, for example, in the case of the primary cache L1, is a range of an operable count among the blocks of the primary cache L1, and in the case of the primary cache L1, is 1 to 4. As an operations state evaluation means used in the search, a power/performance evaluation technique such as that of David Brooks, et al, "Wattch: A Framework for Architectural-Level Power Analysis and Optimizations", ISCA, 2000, p. 83-94 can be used. As a means of searching for an optimal solution, for example, a simple optimized scheme such as a successive search of repeated local searches in which an operation state where the value of one specified element of the CPU is changed in stages is regarded as an approximate solution may be used, a sophisticated algorithm that searches for higher quality approximate solutions may be used. The state information generating unit 501 registers to a state list 600, the state information obtained for each lower limit processing performance value among the lower limit processing performance values which differ.

FIG. 6 is a diagram depicting a state list example. The state list 600 includes state information 601 indicating the operation states for each operation state combination. The state information 601, for each element of the CPU 101, has a count of the portion of the elements that are operating among the elements and a count of elements that are operating among identical elements. More specifically, the state list 600 has fields for computing pipeline counts, primary cache L1 way counts, instruction issue widths, MIB entry counts, etc. By setting information into the fields, state information (601-A to 601-D, etc.) is stored as records. For example, in the computing pipeline count field, a count of the computing pipelines in operation is set. In the primary cache L1 way count field, a count of ways in operation in the primary cache L1 is set. For example, in the instruction issue width field, an instruction issue width, which is a count of instructions that can be issued in parallel from the decoder 412 to the reservation station 413, is set. For example, in the MIB entry count, a count of the entries in the move-in buffer 421 is set. The state list 600, for example, is stored to a storage apparatus such as the RAM 302 and the disk 304.

The obtaining unit 502, for each operation state combination for the CPU 101 whose operation state is changeable, obtains the state information 601 that indicates the operation states. Here, the obtaining unit 502 obtains the state list 600 generated by the state information generating unit 501.

The measuring unit 503, for each obtained record of the state information 601, causes the CPU 101 whose operation state has been changed to that indicated by the state information 601, to execute a specific program for a given period and thereby, measures the power consumption value and processing performance value of the CPU 101 after the change. The given period is defined by the user and is pre-stored to a storage apparatus such as the RAM 302 and the disk 304. More specifically, the measuring unit 503 causes the power consumption control unit 403, the power consumption value measuring unit 401, and the processing performance value measuring unit 402 to measure the power consumption value and the processing performance value. For example, the frequency and the state information 601 can be configured in the power consumption control unit 403; and the power consumption control unit 403 has a current mode configuration register 406 in which the current measured power consumption value is configured.

Here, for example, the measuring unit 503 configures the frequency and the state information 601. The power consumption control unit 403 changes the operation state of the configured CPU 101 to the operation state indicated by the state information 601, and changes the frequency of the clock signal supplied in the operation state of the CPU 101 to become the configured frequency. The measuring unit 503 further sets the measured power consumption value in the current mode configuration register 406. In the first example, a reference frequency is configured. Here, the execution period, for example, is a period enabling the processing performance value and the power consumption value to be measured. Although not depicted, the processing performance value measuring unit 402 can measure the processing performance value consequent to the provision of a circuit that at a constant interval, integrates the instruction issue count of each cycle for an instruction issue portion in the CPU 101. The instruction issue portion is the portion that transfers instruction information from the decoder 412 to the reservation station 413; and the integrating circuit described above integrates the instruction counts transferred from the decoder 412 to the reservation station 413. Further, for example, the power consumption value is measured distinguishing static power values and dynamic power values.

Figure 7:
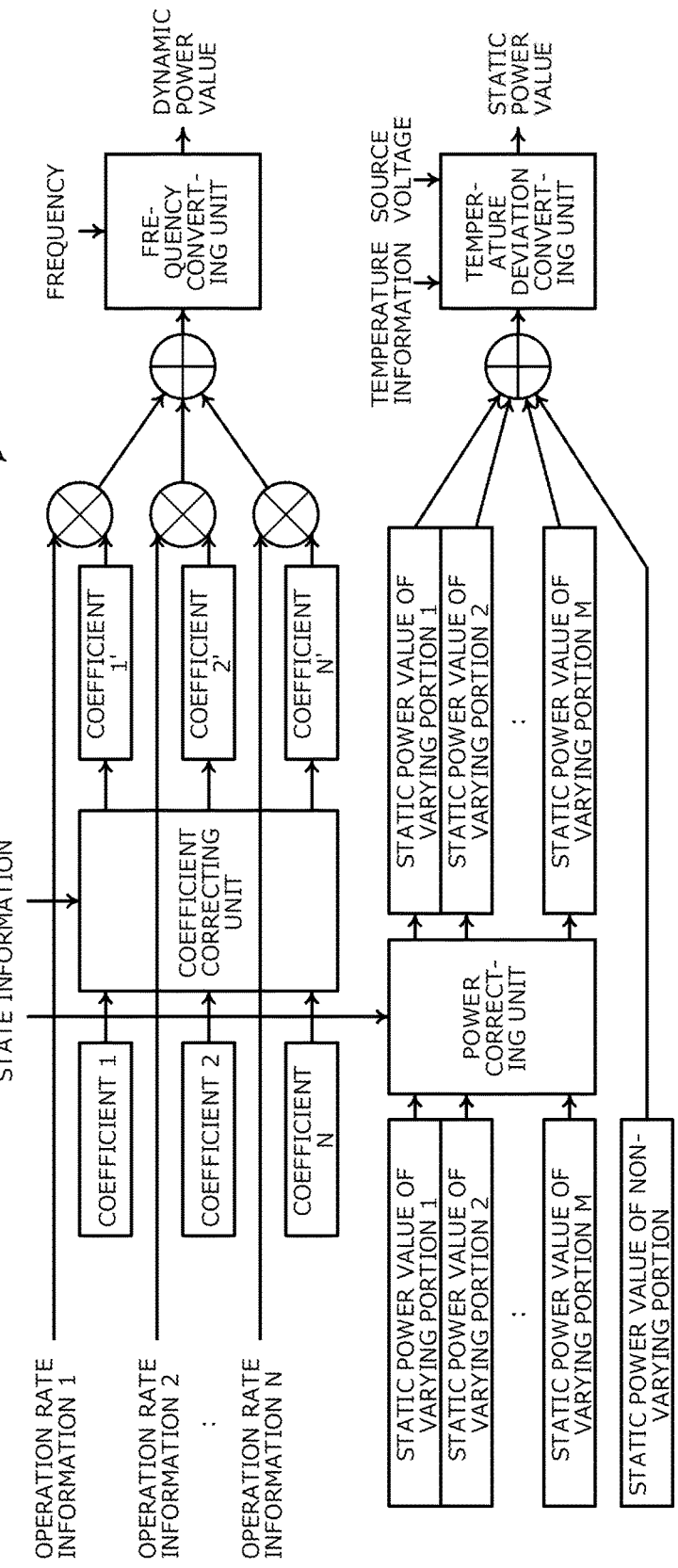
FIG. 7 is a diagram depicting a detailed example of a power consumption value measuring unit.

FIG. 7 is a diagram depicting a detailed example of the power consumption value measuring unit. The power consumption value measuring unit 401 estimates the dynamic power value based on an operation rate of the elements in the CPU 101, and estimates a static power value based on a static power value of a varying portion and a static power value of a non-varying portion.

More specifically, the power consumption value measuring unit 401, by a coefficient correcting unit, uses the state information 601 and corrects a coefficient of each operation rate. Coefficients 1 to N are values that are defined in advance by a means such as regression analysis, based on the operation rate indicated by operation rate information of the elements. The coefficients 1 to N are preconfigured in a register in the CPU 101. The state information 601 is obtained from the current mode configuration register 406 of the CPU 101. The power consumption value measuring unit 401 multiples the corrected coefficients 1' to N' and the operate rate indicated by the operation rate information and thereby, calculates a dynamic power value of each element. Operation rate information 1 to N, for example, is information indicating respective operation rates of the elements in the CPU 101. The operation rate information, for example, is information indicating the operation rate of the primary cache L1, information indicating the operation rate of the computation device, and the like. The operation rate of the primary cache L1, for example, is an access count per unit time for the primary cache L1. Although not depicted, each element is equipped with a counter capable of measuring access to the element; and the operation rate is assumed to be calculated based on the counter value. The power consumption value measuring unit 401 calculates the sum of the dynamic power values. Subsequently, the power consumption value measuring unit 401, by a frequency converting unit, performs frequency conversion with respect to the sum of the dynamic power values of the elements to calculate a dynamic power value.

The power consumption value measuring unit 401 uses temperature information and deviation information of respective processes to correct and estimate static power values of the CPU 101 under an averaging condition pre-estimated for the static power values. More specifically, the power consumption value measuring unit 401, by a power correcting unit, uses the state information 601 to correct the static power values of varying portions 1 to M that are based on a physical element count of the elements. The static power values here are preconfigured in a register in the CPU 101. Taking the primary cache L1 as an example, when among the four blocks, only two blocks are operated, the value of half of the static power value of the primary cache L1 becomes the corrected static power value of the varying portion. However, in a case of no power gating, the static power values of the elements do not vary and therefore, all static power values of non-varying portions are fixed values and thus, the static power values are not corrected using the state information 601.

The power consumption value measuring unit 401 adds the corrected static power values of the varying portions 1 to M and the static power values of the non-varying portions. The power consumption value measuring unit 401 performs conversions such as conversion of deviations consequent to manufacturing allowances and conversion of temperatures consequent to the temperature, as well as power supply voltage conversion, and outputs a static power value. The deviation information indicating manufacturing tolerances, for example, is information preconfigured in a register in the CPU 101 and information obtained via the input device 306. The temperature information indicating temperatures, for example, is information obtained from an apparatus capable of measuring temperature. The power source voltage value is a value obtained from a circuit that supplies power source voltage to the elements of the CPU 101. Power consumption value measurement results, for example, are configured in a storage apparatus such as the RAM 302 and the disk 304, the current mode configuration register 406, etc.

The power consumption value measuring unit 401 and the processing performance value measuring unit 402 may be configured by elements such as flip flops (FF) including AND circuits, NOT circuits, OR circuits, latch circuits, etc. Further, the components may be realized by standard cell and/or structured application specific integrated circuits (ASIC); programmable logic devices (PLD) such as field programmable gate arrays (FPGA), etc. More specifically, for example, functions of the power consumption value measuring unit 401 and the processing performance value measuring unit 402 described above may be functionally defined in a netlist by hardware description language to realize each component by logically synthesizing and providing the netlist to the ASIC, PLD, etc.

The power consumption value measuring unit 401 and the processing performance value measuring unit 402 may be coded in a measuring program stored in a storage apparatus accessible by the CPU 101. The CPU 101 reads out the measuring program from the storage apparatus and executes processes coded in the measuring program, whereby processes of the power consumption value measuring unit 401 and the processing performance value measuring unit 402 may be realized. Further, measurement results of the power consumption value measuring unit 401 and the processing performance value measuring unit 402, for example, may be stored to a storage apparatus such as the RAM 302 and the disk 304, configured in a dedicated register pre-equipped in the CPU 101, etc.

FIG. 8 is a diagram depicting an example of the state list in which the state information includes measurement results. For example, each record of the state information 601 in the state list 600 includes a dynamic power value, a static power value, and a processing performance value.

For each of the specified power consumption values which differ, the selecting apparatus 100 selects from the obtained state information 601, a record of the state information 601 among the state information for which the difference of the measured power consumption value and the specified power consumption value is a given value or less, based on the measured processing performance value. The specified power consumption values are preconfigured by the designer. Further, from among the state information 601 for which the difference is the given value or less, the selecting apparatus 100 selects the state information 601 that indicates the operation state for which the processing performance indicated by the measured processing performance value is the highest. The selecting apparatus 100 outputs a selection result as a control mode table 1000.

Figure 9:
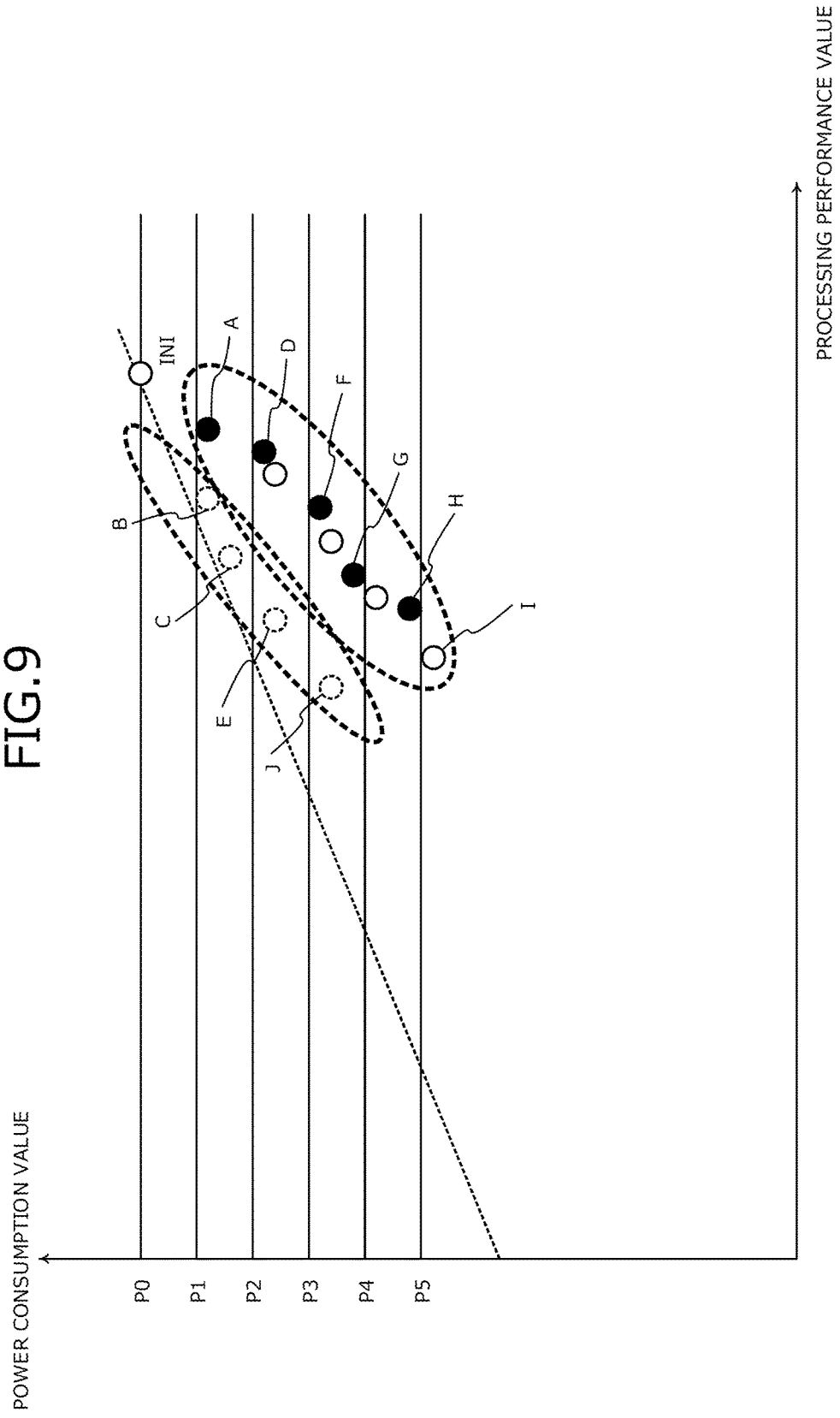
FIG. 9 is a diagram depicting a state information selection example according to a first example.

FIG. 9 is a diagram depicting a state information selection example according to the first example. In the graph, the horizontal axis represents processing performance values and the vertical axis represents power consumption values. Points indicated by ○ are points plotted based on the measured power consumption values and the measured processing performance values concerning the state information 601. Points indicated by ● are points plotted based on the measured power consumption values and the measured processing performance values concerning configuration information for specified power consumption values P1 to P5. For a specified power consumption value P0, the specified state information INI is selected.

More specifically, the selecting unit 504 sorts the state information 601 in the state list 600 in descending order of the total value of the static power value and the dynamic power value. From the state list 600, the selecting apparatus 100 deletes records of the state information 601 for which the processing performance values are not in descending order in the sorted state list 600. As a result, the state information 601 indicating operation states of low power efficiency can be deleted. Here, for example, the state information 601-B, the state information 601-C, the state information 601-E, and the state information 601-J are deleted from the state list 600.

For each predetermined power consumption value, the selecting unit 504 selects the state information 601 by which the measured power consumption power becomes the predetermined power consumption value or less, based on the processing performance value. The predetermined power consumption values, for example, are the specified power consumption values P1 to P5 respectively, or are values that include the respective specified power consumption values P1 to P5 and an allowable margin of error. Further, the selecting unit 504 selects the state information 601 for which the processing performance indicated by the processing performance value is the highest.

More specifically, the selecting unit 504 calculates the difference of the specified power consumption value and the total of the static power value and the dynamic power value for each record of the state information 601. For each of the specified power consumption values P1 to P5, the selecting unit 504 detects the state information 601 by which the difference becomes within a given value. The given value is the allowable margin of error. Further, the selecting unit 504 selects the state information 601 for which the processing performance indicated by the processing performance value is the highest among the state information 601 by which the difference becomes within the given value. When no state information 601 is present by which the difference becomes within the given value, the selecting unit 504 selects the state information 601 for which the processing performance indicated by the processing performance value is the highest among the state information 601 by which the total becomes the specified power consumption value or less.

For example, the selecting unit 504 selects the state information 601-A for the specified power consumption value P1. For example, the selecting unit 504 selects the state information 601-D for the specified power consumption value P2. For example, the selecting unit 504 selects the state information 601-F for the specified power consumption value P3. For example, the selecting unit 504 selects the state information 601-G for the specified power consumption value P4. For example, the selecting unit 504 selects the state information 601-H for the specified power consumption value P5.

The control mode table generating unit 506 generates a table that associates each of the specified power consumption values P0 to P5, the state information 601 selected for the specified power consumption value, and the frequency at the time of measurement. The table is referred to as the control mode table 1000. For example, the generated control mode table 1000 is stored to a storage apparatus such as the RAM 302 and the disk 304. Further, before a control process is performed that uses the control mode table 1000, the CPU 101 stores the control mode table 1000 to the control mode table storage buffer 405.

FIG. 10 is a diagram depicting an example of the control mode table. The control mode table 1000, for example, has fields for specified power consumption values, frequencies, and the state information 601. In the specified power consumption value field, the specified power consumption values described above are set. In the frequency field, the frequency at the time of measurement is set. In the state information 601 field, the selected state information 601 is set. In the example depicted in FIG. 10, in the state information 601 field, the state information 601 is omitted and identification information identifying the state information 601 is set, nonetheless, operation states, etc. of the elements is actually set as depicted by the state information 601 in FIG. 6. By setting information in each of the fields, the information is stored as records (1001-0 to 1001-5).

Figure 11:
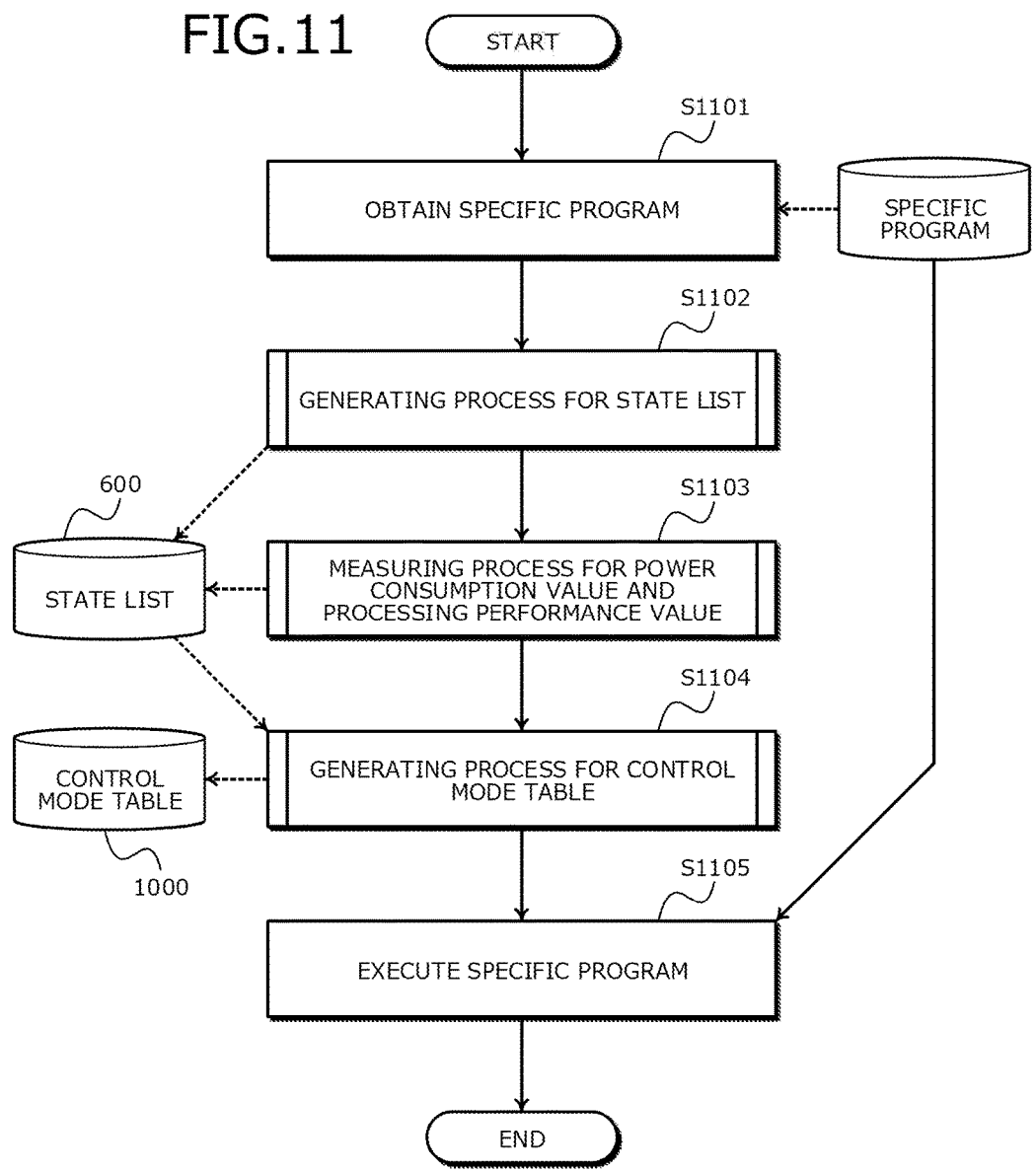
FIG. 11 is a flowchart of an example of a procedure of a selecting process by the selecting apparatus according to the first example.

FIG. 11 is a flowchart of an example of a procedure of the selecting process by the selecting apparatus according to the first example. The selecting apparatus 100 obtains a specific program (step S1101). The selecting apparatus 100 performs a generating process for the state list 600, based on the specific program (step S1102). The selecting apparatus 100 performs a measuring process for the power consumption value and the processing performance value, based on the specific program (step S1103). The selecting apparatus 100 performs a generating process for the control mode table 1000 (step S1104). The selecting apparatus 100 executes the specific program at the time of operation (step S1105), and ends the series of operations.

Figure 12:
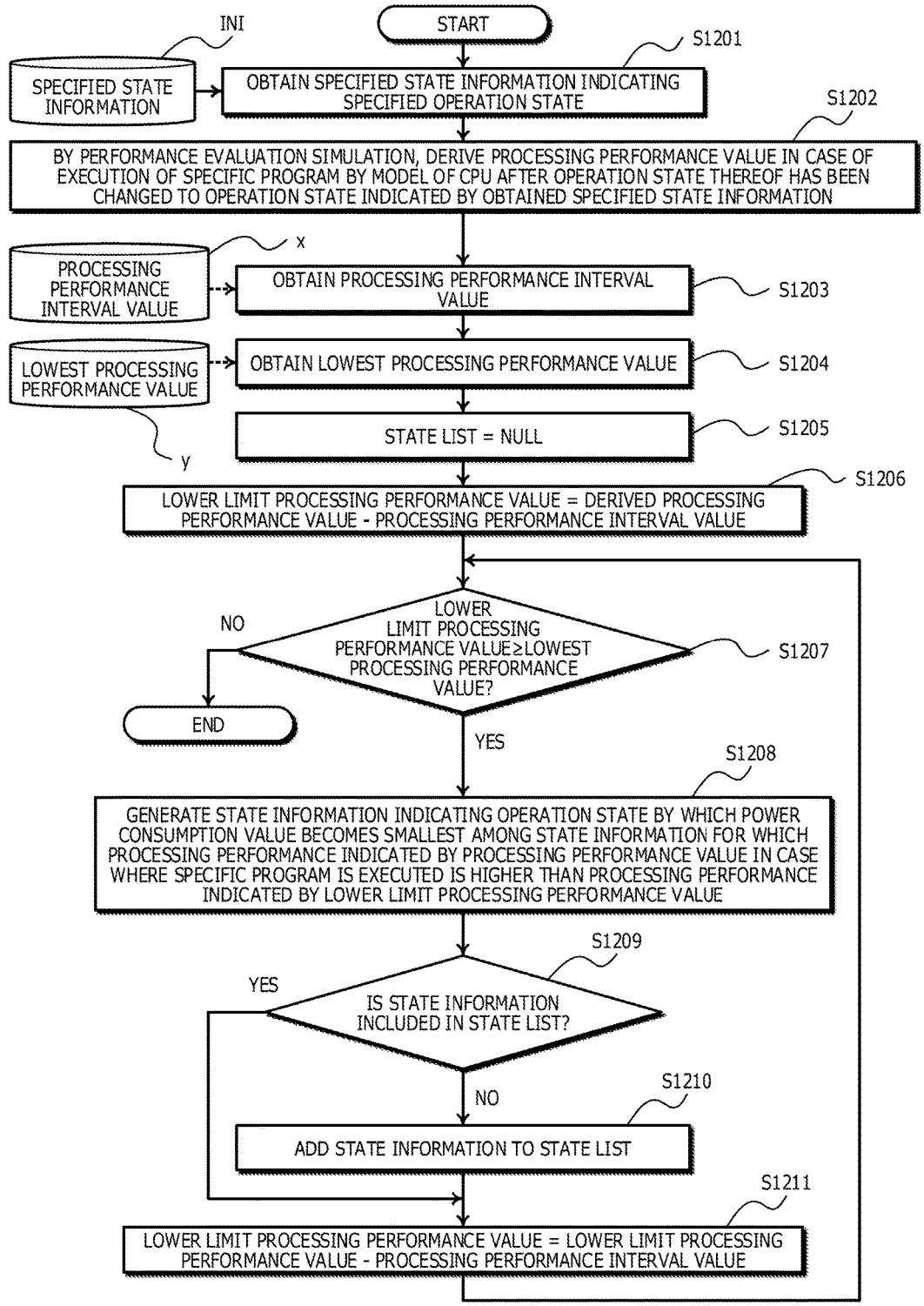
FIG. 12 is a flowchart of an example of a procedure of a generating process for the state list depicted in FIG. 11.

FIG. 12 is a flowchart of an example of a procedure of the generating process for the state list depicted in FIG. 11. The selecting apparatus 100 obtains the specified state information INI indicating the specified operation state (step S1201). The selecting apparatus 100 derives by performance evaluation simulation, a processing performance value in a case of execution of the specific program by a model of the CPU 101 after the operation state thereof has been changed to the operation state indicated by the obtained specified state information INI (step S1202). The selecting apparatus 100 obtains a processing performance interval value x (step S1203).

The selecting apparatus 100 obtains a lowest processing performance value y (step S1204). The selecting apparatus 100 sets the state list 600=null (step S1205). The selecting apparatus 100 sets a lower limit processing performance value=the derived processing performance value–the processing performance interval value x (step S1206). The selecting apparatus 100 determines whether the lower limit processing performance value≥the lowest processing performance value y is true (step S1207). If the lower limit processing performance value≥the lowest processing performance value y is true (step S1207: YES), the selecting apparatus 100 generates the state information 601 indicating the operation state by which the power consumption value becomes the smallest among the state information 601 for which the processing performance indicated by the processing performance value in a case where the specific program is executed is higher than the processing performance indicated by the lower limit processing performance value (step S1208). The selecting apparatus 100 determines whether the generated state information 601 is included in the state list 600 (step S1209).

If the generated state information 601 is included in the state list 600 (step S1209: YES), the selecting apparatus 100 advances to step S1211. If the generated state information 601 is not included in the state list 600 (step S1209: NO), the selecting apparatus 100 adds the state information 601 to the state list 600 (step S1210). The selecting apparatus 100 sets the lower limit processing performance value=the lower limit processing performance value–the processing performance interval value x (step S1211), and returns to step S1207. At step S1207, if the lower limit processing performance value≥the lowest processing performance value y is not true (step S1207: NO), the selecting apparatus 100 ends the series of operations.

Figure 13:
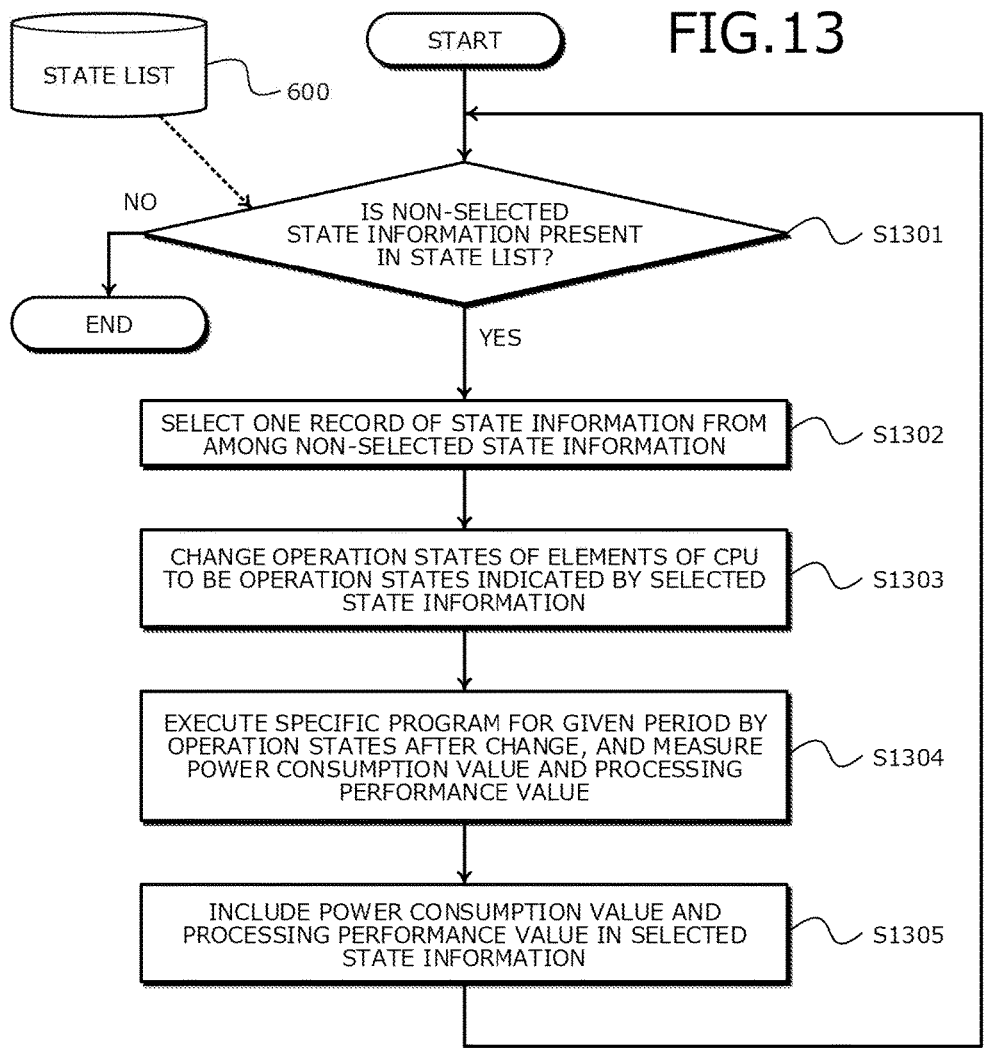
FIG. 13 is a flowchart of a measuring process for a power consumption value and a processing performance value depicted in FIG. 11.

FIG. 13 is a flowchart of the measuring process for the power consumption value and the processing performance value depicted in FIG. 11. The selecting apparatus 100 determines whether non-selected state information 601 that has yet to be selected is present in the state list 600 (step S1301). If non-selected state information 601 is present (step S1301: YES), the selecting apparatus 100 selects one record of the state information 601 from among the non-selected state information 601 (step S1302). The selecting apparatus 100 changes the operation states of the elements of the CPU 101 to be the operation states indicated by the selected state information 601 (step S1303).

The selecting apparatus 100 executes the specific program for a given period by the operation states after the change, and measures the power consumption value and the processing performance value (step S1304). The selecting apparatus 100 includes the measured power consumption value and processing performance value in the selected state information 601 (step S1305), and returns to step S1301.

At step S1301, if non-selected state information 601 is not present in the state list 600 (step S1301: NO), the selecting apparatus 100 ends the series of operations.

Figure 14:
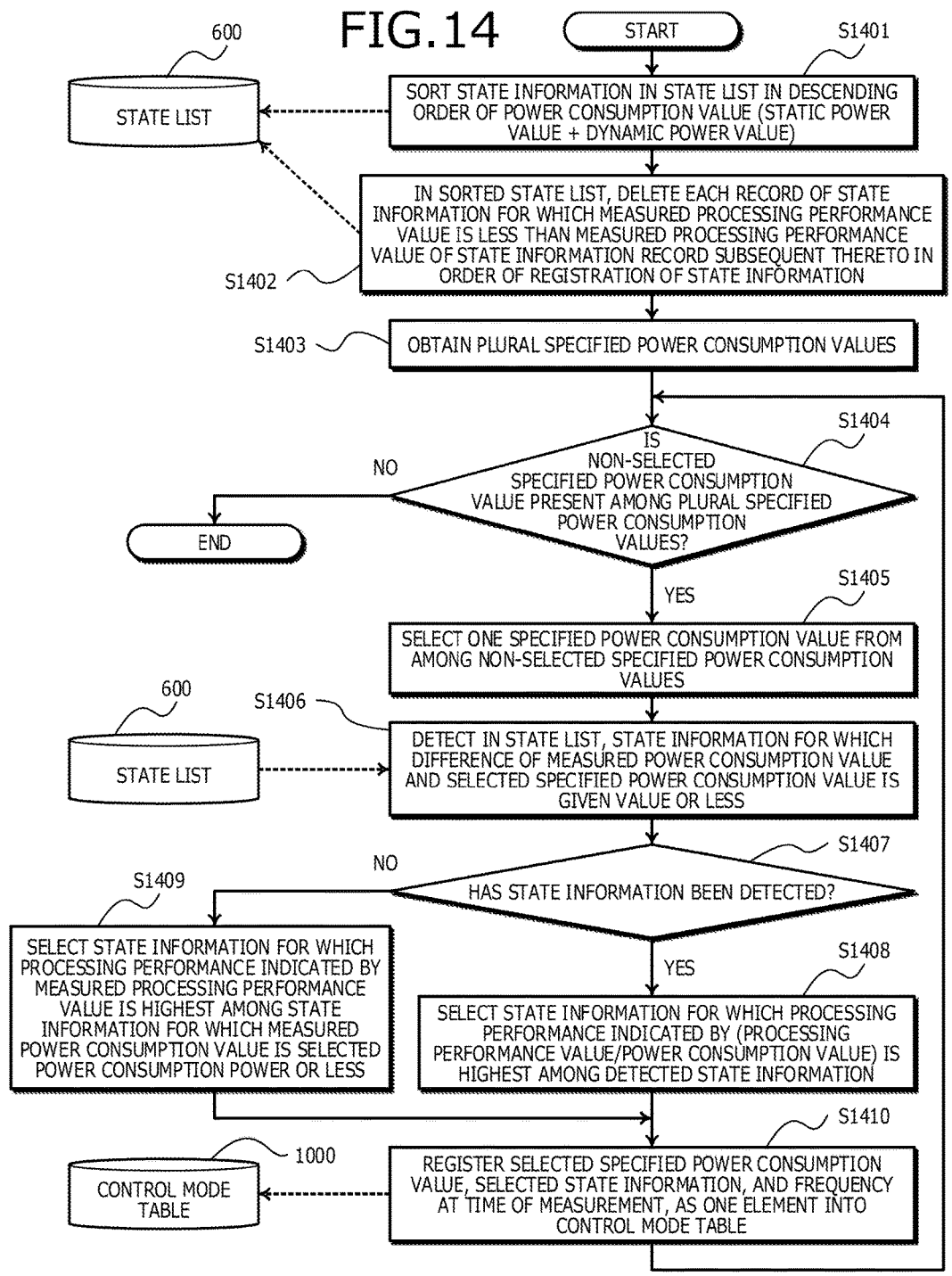
FIG. 14 is a flowchart of the generating process for the control mode table depicted in FIG. 11.

FIG. 14 is a flowchart of the generating process for the control mode table depicted in FIG. 11. The selecting apparatus 100 sorts the state information 601 in the state list 600 in descending order of power consumption values (step S1401). The selecting apparatus 100, in the sorted state list 600, deletes each record of the state information 601 for which the measured processing performance value is less than the measured processing performance value of the record of the state information 601 subsequent thereto in the order of registration of the state information 601 (step S1402). Records of the state information 601 for which the processing performance indicated by the processing performance values are not in descending order, despite the state information 601 being sorted in descending order of power consumption values, are deleted.

The selecting apparatus 100 obtains plural specified power consumption values (step S1403). The selecting apparatus 100 determines whether a non-selected specified power consumption value is present among plural specified power consumption values (step S1404). If a non-selected specified power consumption value is present (step S1404: YES), the selecting apparatus 100 selects one specified power consumption value from among the non-selected specified power consumption values (step S1405). The selecting apparatus 100 detects in the state list 600, the state information 601 for which the difference of the measured power consumption value and the selected specified power consumption value is a given value or less (step S1406). The given value is the allowable margin of error described above.

The selecting apparatus 100 determines whether the state information 601 has been detected (step S1407). If the state information 601 has been detected (step S1407: YES), the selecting apparatus 100 selects the state information 601 for which the processing performance indicated by (processing performance value/power consumption value) is the highest among the detected state information 601 (step S1408), and transitions to step S1410. If the state information 601 has not been detected (step S1407: NO), the selecting apparatus 100 selects the state information 601 for which the processing performance indicated by the measured processing performance value is the highest among the state information 601 for which the measured power consumption value is the selected power consumption power or less (step S1409).

The selecting apparatus 100 registers the selected specified power consumption value, the selected state information 601, and the frequency at the time of measurement, as one element into the control mode table 1000 (step S1410), and returns to step S1404. At step S1404, if a non-selected specified power consumption value is not present (step S1404: NO), the selecting apparatus 100 ends the series of operations.

In the second example, the processing performance value and the power consumption value of the CPU 101 are measured for each operation state, the measured processing performance value is corrected based on a rate of the measured power consumption value and the respective specified power consumption values, and operation states by which the corrected processing performance value become the highest are selected. Further in the second example, the frequency at the time of measurement is corrected based on this rate. As a result, even when the number of records of the state information 601 is low, the state information 601 by which the processing performance indicated by the processing performance value in a case where the power consumption value becomes the specified power consumption value consequent to a changing of the clock signal frequency can be selected. Therefore, an operation state of high processing performance can be specified at the time of operation, for each power value upper limit.

For each specified power consumption value, the selecting unit 504 selects a record of the state information 601 among the obtained state information 601, based on a processing performance value that is the measured processing performance value corrected based on the rate of the specified power consumption value and the measured power consumption value. Further, the selecting unit 504 selects the state information 601 that indicates the operation state by which the processing performance of the CPU 101 indicated by the corrected processing performance value becomes the highest. More specifically, for each of the specified power consumption values, the selecting unit 504 corrects based on equation (1), the processing performance value measured for each of record of the state information 601.

$$\text{corrected processing performance value} = \text{measured processing performance value} \times (\text{specified power consumption value} - \text{static power value})/(\text{dynamic power value}) \quad (1)$$

For each of the specified power consumption values, the selecting unit 504 selects the state information 601 for which the corrected processing performance value is the highest. (Specified power consumption value−static power value)/(dynamic power value) is the rate.

For each of the specified power consumption values, the frequency deriving unit 505 corrects based on the rate concerning the selected state information 601, the frequency specified when the power consumption value and the processing performance value are measured.

Figure 15:
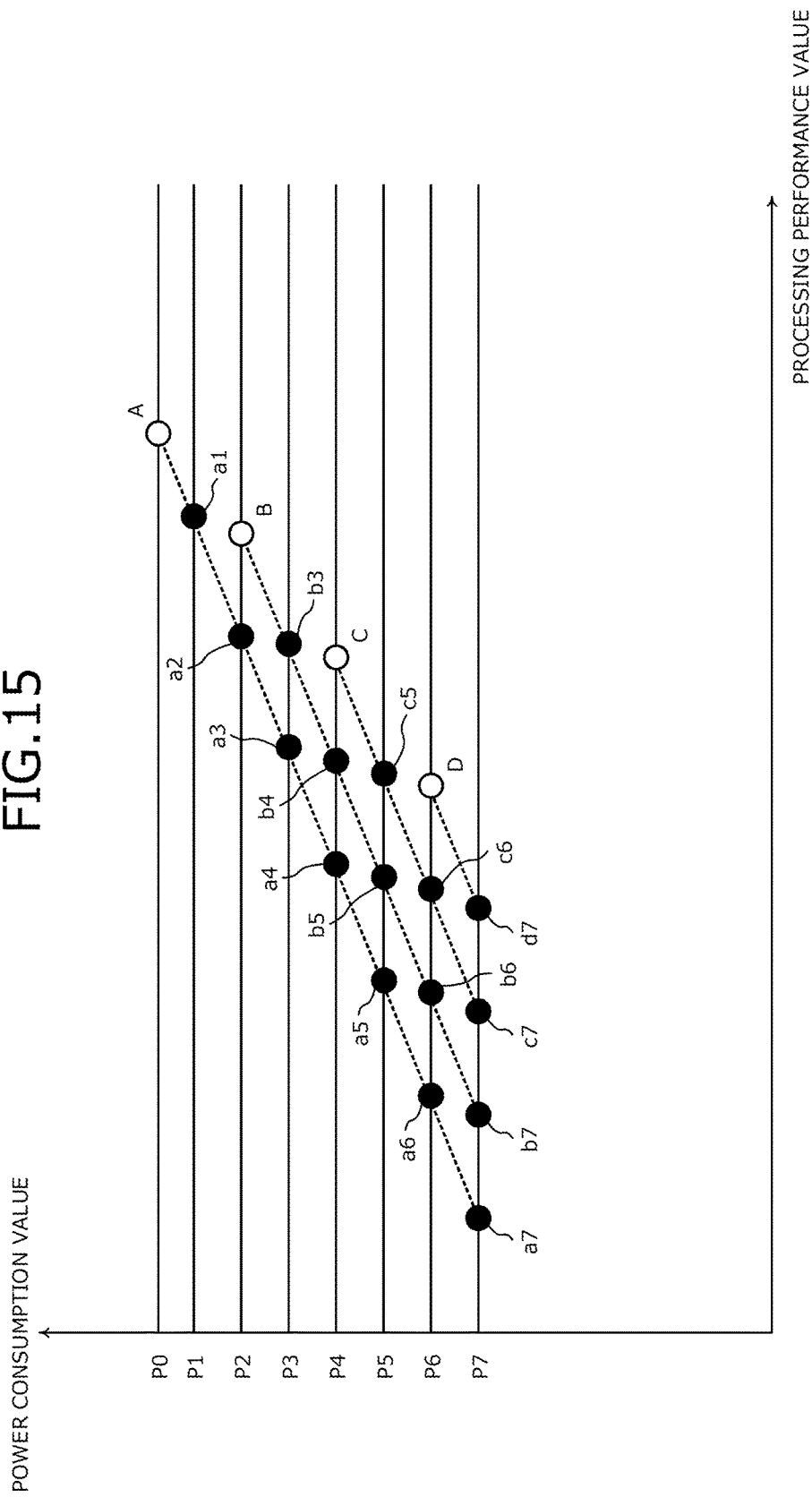
FIG. 15 is a diagram depicting an example of state information according to a second example.

FIG. 15 is a diagram depicting an example of state information according to the second example. Here, frequency f0 at the time of measurement is assumed to be the highest frequency among frequencies that can be set by the CPU 101. Therefore, the state information 601 that is to be corrected for each of the specified power consumption values is assumed to be the state information 601 for which the measured power consumption value is greater than the specified power consumption value.

In FIG. 15, in the graph, the horizontal axis represents processing performance values and the vertical axis represents power consumption values. Points indicated by ○ are points plotted based on the measured processing performance values and the measured power consumption values for the state information 601. Points indicated by ● are points plotted based on processing performance values that are measured processing performance values that have been corrected and the specified power consumption values concerning the state information 601.

Points a1 to a7 are for the specified power consumption values P1 to P7 respectively, and are points plotted based on processing performance values that are corrected processing performance values measured for the state information 601-A. Points b3 to b7 are for the specified power consumption values P3 to P7 respectively, and are points plotted based on processing performance values that are corrected processing performance values measured for the state information 601-B. Points c5 to c7 are for the specified power consumption values P5 to P7 respectively, and are points plotted based on processing performance values that are corrected processing performance values measured for the state information 601-C. Point d7 is for the specified power consumption value P7, and is plotted based on a processing performance value that is a corrected processing performance value measured for the state information 601-D.

For each specified power consumption value, the selecting unit 504 selects the state information 601 for which the processing performance indicated by the corrected processing performance value is the highest. For example, taking the specified power consumption value P7 as an example, in comparing point a7, point b7, point c7, and point d7, point d7 has the highest processing performance and therefore, the selecting unit 504 selects the state information 601-D.

For each of the specified power consumption values, the control mode table generating unit 506 generates a table associating the state information 601 selected for the specified power consumption value and the corrected frequency corrected for the specified power consumption value. The table generated as in the first example is referred to as the control mode table 1000. For example, the generated control mode table 1000 is stored to a storage apparatus such as the RAM 302 and the disk 304. Further, before a control process that uses the control mode table 1000 is performed, the CPU 101 stores the control mode table 1000 to the control mode table storage buffer 405.

Figure 16:
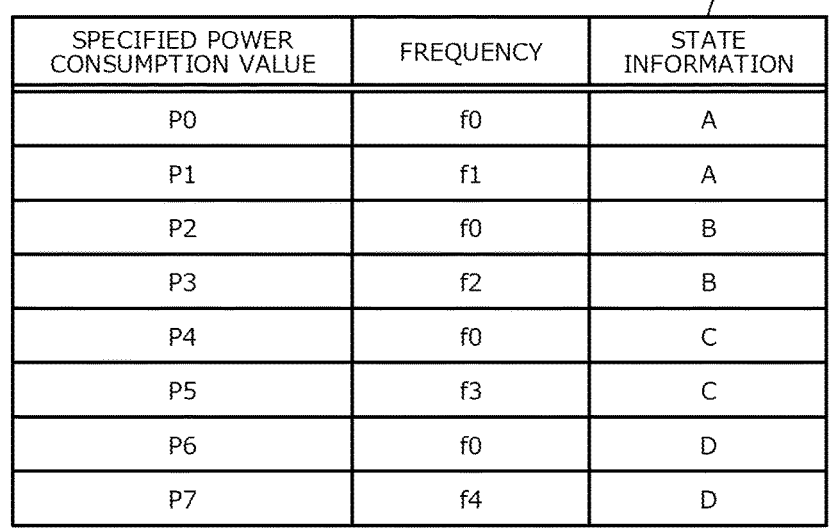
FIG. 16 is a diagram depicting an example of the control mode table according to the second example.

FIG. 16 is a diagram depicting an example of the control mode table according to the second example. Fields of the control mode table 1000 are identical to those in the first example and therefore, detailed description is omitted herein. Based on the control mode table 1000, for the specified power consumption value P0, the state information 601-A is selected and the frequency is f0. For the specified power consumption value P1, the state information 601-A is selected and the frequency is f1. For the specified power consumption value P2, the state information 601-B is selected and the frequency is f0. For the specified power consumption value P3, the state information 601-B is selected and the frequency is f2. For the specified power consumption value P4, the state information 601-C is selected and the frequency is f0. For the specified power consumption value P5, the state information 601-C is selected and the frequency is f3. For the specified power consumption value P6, the state information 601-D is selected and the frequency is f0. For the specified power consumption value P7, the state information 601-D is selected and the frequency is f4.

Figure 17:
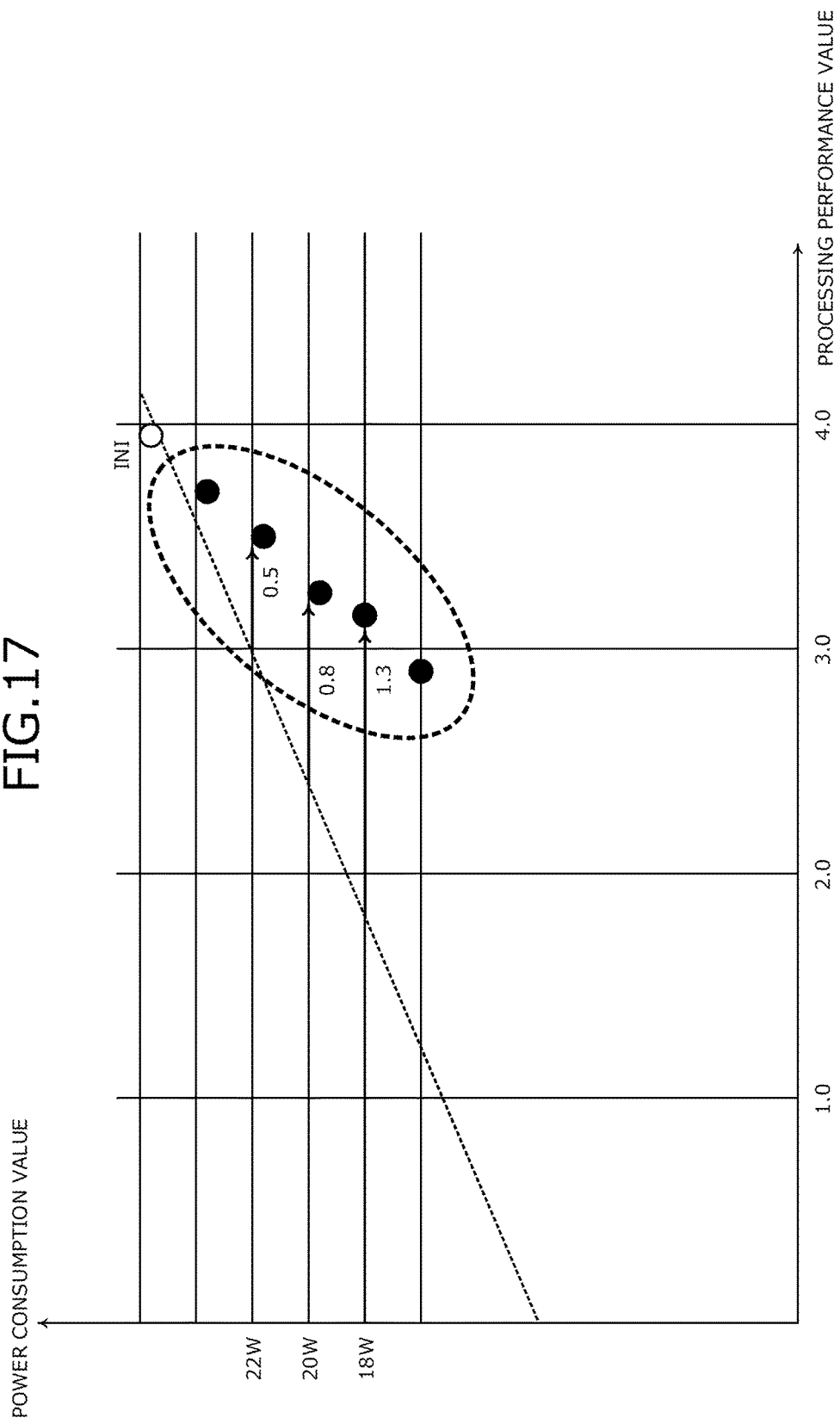
FIG. 17 is a diagram depicting a comparison example of power consumption values and processing performance values for DFS and the second example respectively.

FIG. 17 is a diagram depicting a comparison example of power consumption values and processing performance values for DFS and the second example respectively. In the graph, the vertical axis represents power consumption values and the horizontal axis represents processing performance values. MIPS values are given as the processing performance values. A point indicated by ○ and a dotted line are examples in a case of DFS. In the case of DFS, with the operation state is set to that indicated by one record of the state information 601, the frequency is adjusted whereby, the power consumption values and the processing performance values shift as indicated by the dotted line.

For example, on the line where the power consumption value is 22[W], the MIPS value in the case of adjustment by DFS is 3.0 whereas the MIPS value in the case of adjustment according to the second example is 3.5, the MIPS value improving by 0.5. Similarly, in cases when the power consumption value is 20[W] and 18[W], the MIPS value improves 0.8 and 1.3, respectively. As an example when such a control mode table 1000 is generated, a case will be given where a power adjustment instruction is received by a power management mechanism of a system, where the power adjustment instruction is for operation for 2 seconds with the upper limit of the power consumption value being 22[W], operation for 3 seconds with the upper limit being 20[W], operation for 1 second with the upper limit being 18[W]. In this case, in the second example, in six seconds, 5.7 million more instructions (=0.5×2+0.8×3+1.3×1) can be executed than in the case of DFS.

In the second example, a procedure of the generating process for the control mode table 1000 by the selecting apparatus 100 and differing from the first example will be described while description of portions identical to the first example will be omitted.

Figure 18:
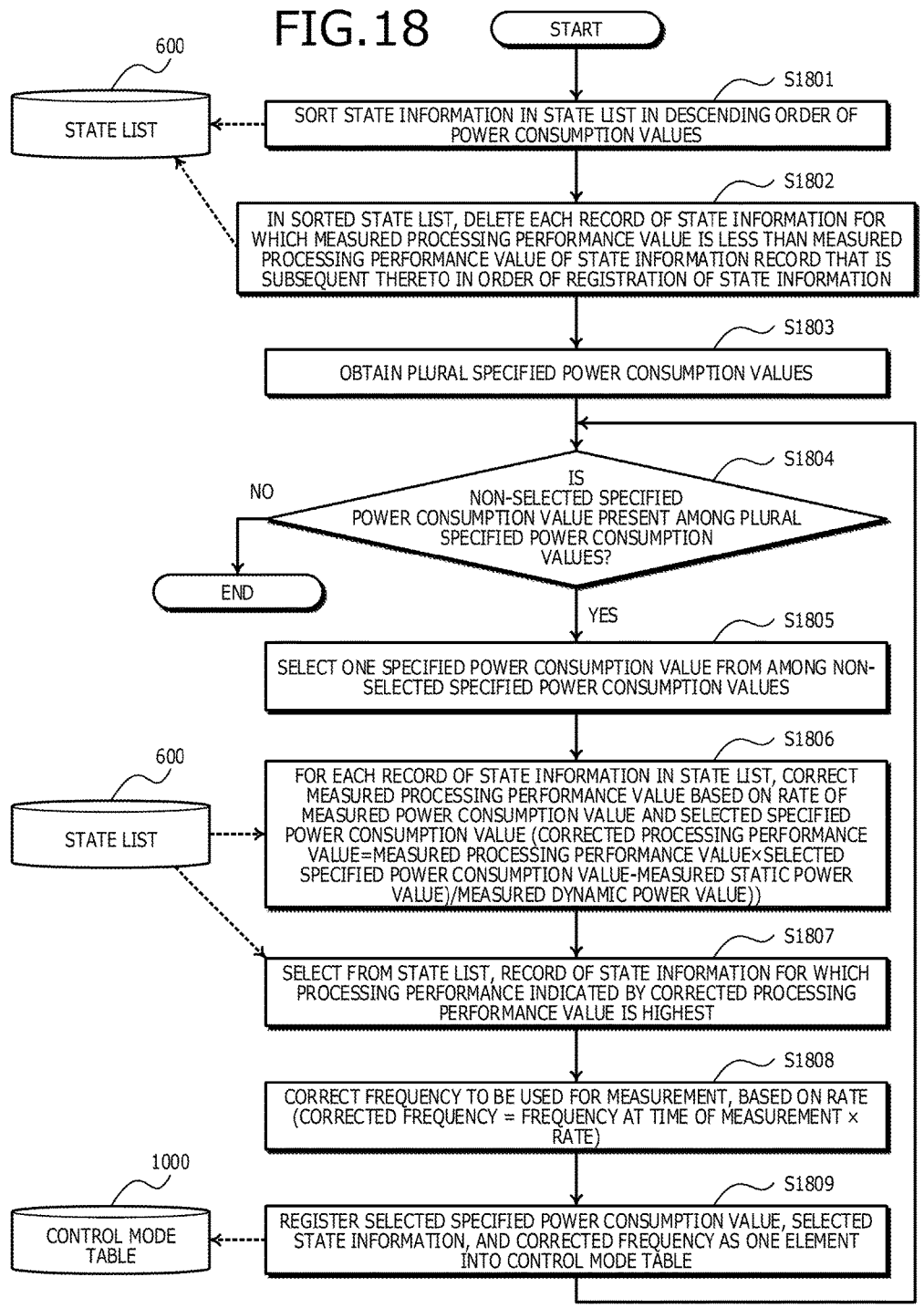
FIG. 18 is a flowchart of the generating process for the control mode table depicted in FIG. 11.

FIG. 18 is a flowchart of the generating process for the control mode table depicted in FIG. 11. The selecting apparatus 100 sorts the state information 601 in the state list 600 in descending order of power consumption values (step S1801). The selecting apparatus 100, in the sorted state list 600, deletes each record of the state information 601 for which the measured processing performance value is less than the measured processing performance value of the record of the state information 601 subsequent thereto in the order of registration of the state information 601 (step S1802).

The selecting apparatus 100 obtains plural specified power consumption values (step S1803). The selecting apparatus 100 determines whether a non-selected specified power consumption value is present among the plural specified power consumption value (step S1804). If a non-selected specified power consumption value is present (step S1804: YES), the selecting apparatus 100 selects one specified power consumption value from among the non-selected specified power consumption values (step S1805).

The selecting apparatus 100, for each record of the state information 601 in the state list 600, corrects the measured processing performance value based on the rate of the measured power consumption value and the selected specified power consumption value (step S1806). More specifically, the selecting apparatus 100, with respect to each record of the state information 601, calculates "corrected processing performance value=measured processing performance value×(selected specified power consumption value−measured static power value)/measured dynamic power value)".

The selecting apparatus 100 selects from the state list 600, the record of the state information 601 for which the processing performance indicated by the corrected processing performance value is the highest (step S1807). The selecting apparatus 100 corrects the frequency to be used for measurement, based on the rate (step S1808). More specifically, the selecting apparatus 100 calculates "corrected frequency=frequency at the time of measurement×rate". The rate is ((selected specified power consumption value−measured static power value)/measured dynamic power value), and may be "corrected processing performance value/measured processing performance value".

The selecting apparatus 100 registers the selected specified power consumption value, the selected state information 601, and the corrected frequency as one element into the control mode table 1000 (step S1809), and returns to step S1804. At step S1804, if a non-selected specified power consumption value is not present (step S1804: NO), the selecting apparatus 100 ends the series of operations.

Figure 19:
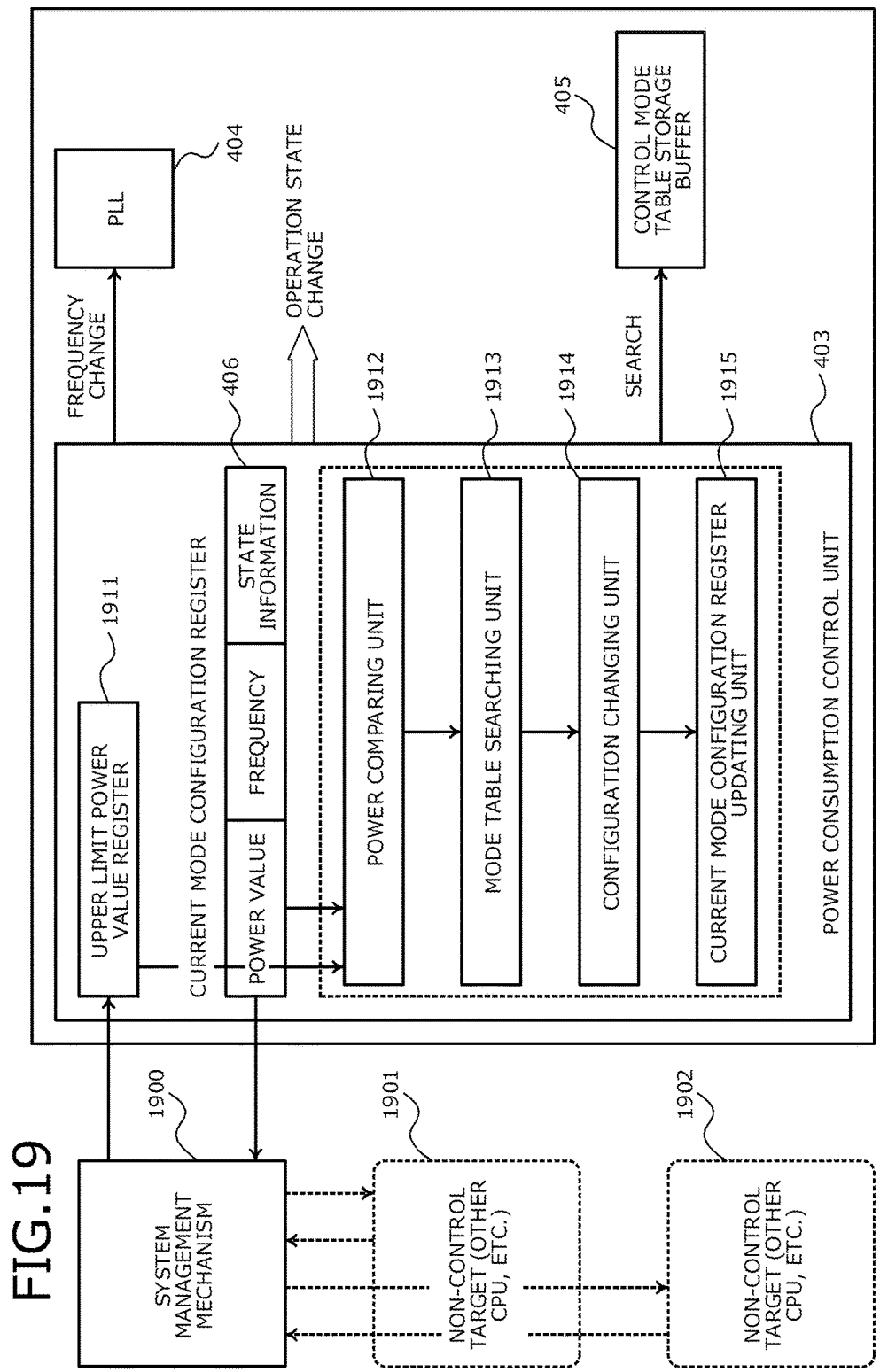
FIG. 19 is a diagram depicting an example of power consumption value control based on the control mode table.

FIG. 19 is a diagram depicting an example of power consumption value control based on the control mode table. The power consumption control unit 403, for example, has an upper limit power value register 1911, current mode configuration registers 406, a power comparing unit 1912, a mode table searching unit 1913, a configuration changing unit 1914, and a current mode configuration register updating unit 1915. Further, the components may be configured by elements such as FF including AND circuits, NOT circuits, OR circuits, latch circuits, etc. Further, the components may be realized by standard cell and/or structured ASICs; PLD such as FPGA, etc. More specifically, for example, functions of the components above may be functionally defined in a netlist by hardware description language to realize each component by logically synthesizing and providing the netlist to the ASIC, PLD, etc.

The current mode configuration registers 406 are registers in which a power value, the frequency, the state information 601 can be configured. Among the current mode configuration registers 406, in a register in which a power value can be configured, the power consumption value measured by the power consumption value measuring unit 401 is configured. Among the current mode configuration registers 406, in a register in which the frequency can be configured, the frequency of each clock supplied to the elements is configured. Among the current mode configuration registers 406, a register in which the state information 601 can be configured, the state information 601 indicating the current operation states of the elements of the CPU 101 is configured.

The power consumption control unit 403 configures in the upper limit power value register 1911, an upper limit power value received from a system management mechanism 1900. For example, though not depicted, the CPU 101 may be a processor included in a multiprocessor system. Therefore, the system management mechanism 1900, for example, is a mechanism for executing jobs by the entire system such that power consumption constraints of the system are not exceeded. For example, the system management mechanism 1900 may be dedicated hardware, software such as OS executed on the CPU 101 or on a CPU other than the CPU 101 such as a non-control target 1901 and a non-control target 1902, etc. The system management mechanism 1900 determines upper limit power consumption values for the CPUs 101 operating among the multiprocessors and controls the power consumption of the CPUs 101, based on power constraints of the system and power management policies such as whether priority is given to power consumption or performance.

The power comparing unit 1912 compares the upper limit power value configured in the upper limit power value register 1911 and the power value configured in the current mode configuration register 406. If the power value configured in the current mode configuration register 406 is greater than the upper limit power value configured in the upper limit power value register 1911, the mode table searching unit 1913 searches the control mode table 1000 stored in the control mode table storage buffer 405 for the state information 601 and frequency. If the power value configured in the current mode configuration register 406 is the upper limit power value configured in the upper limit power value register 1911 or less, and the difference of the power value and the upper limit power value is within a given value, the mode table searching unit 1913 searches for the state information 601 and frequency. Here, the given value, for example, is assumed to be the difference between the closest specified power consumption values. The given value, for example, is assumed to be preconfigured in a register in the CPU 101. More specifically, the mode table searching unit 1913 searches the control mode table 1000 stored in the control mode table storage buffer 405 for the state information 601 and frequency associated with a specified power consumption value that is the upper limit power value or less. The control mode table 1000 is the control mode table 1000 generated in the first example or the second example. The mode table searching unit 1913, among retrieved frequencies and records of the state information 601, searches for a record of the state information 601 and frequency for which the specified power consumption value is closest to the upper limit power value. Further, the mode table searching unit 1913 searches for a record of the state information 601 and frequency that differ from the state information 601 and frequency configured in the current mode configuration register 406.

The configuration changing unit 1914, after interrupting a program under execution, changes the processors to the operation states indicated by the retrieved state information 601 and notifies the PLL 404 of the change to the retrieved frequency. The current mode configuration register updating unit 1915, after the change by the configuration changing unit 1914, configures the retrieved state information 601 and frequency into the current mode configuration register 406. The current mode configuration register updating unit 1915 resumes the execution of the interrupted program.

Further, in the example depicted in FIG. 19, although a case where a circuit different from elements concerned with instruction execution in the CPU 101 is described, configuration is not limited hereto. For example, an interrupt occurs as a trigger for updating of the upper limit power value register 1911, and functions of the mode table searching unit 1913 and the power comparing unit 1912 may be realized by software as exception handling. Further, an interrupt occurs as a trigger for comparison by the power comparing unit 1912, and the function of the mode table searching unit 1913 may be realized by software as exception handling.

Figure 20:
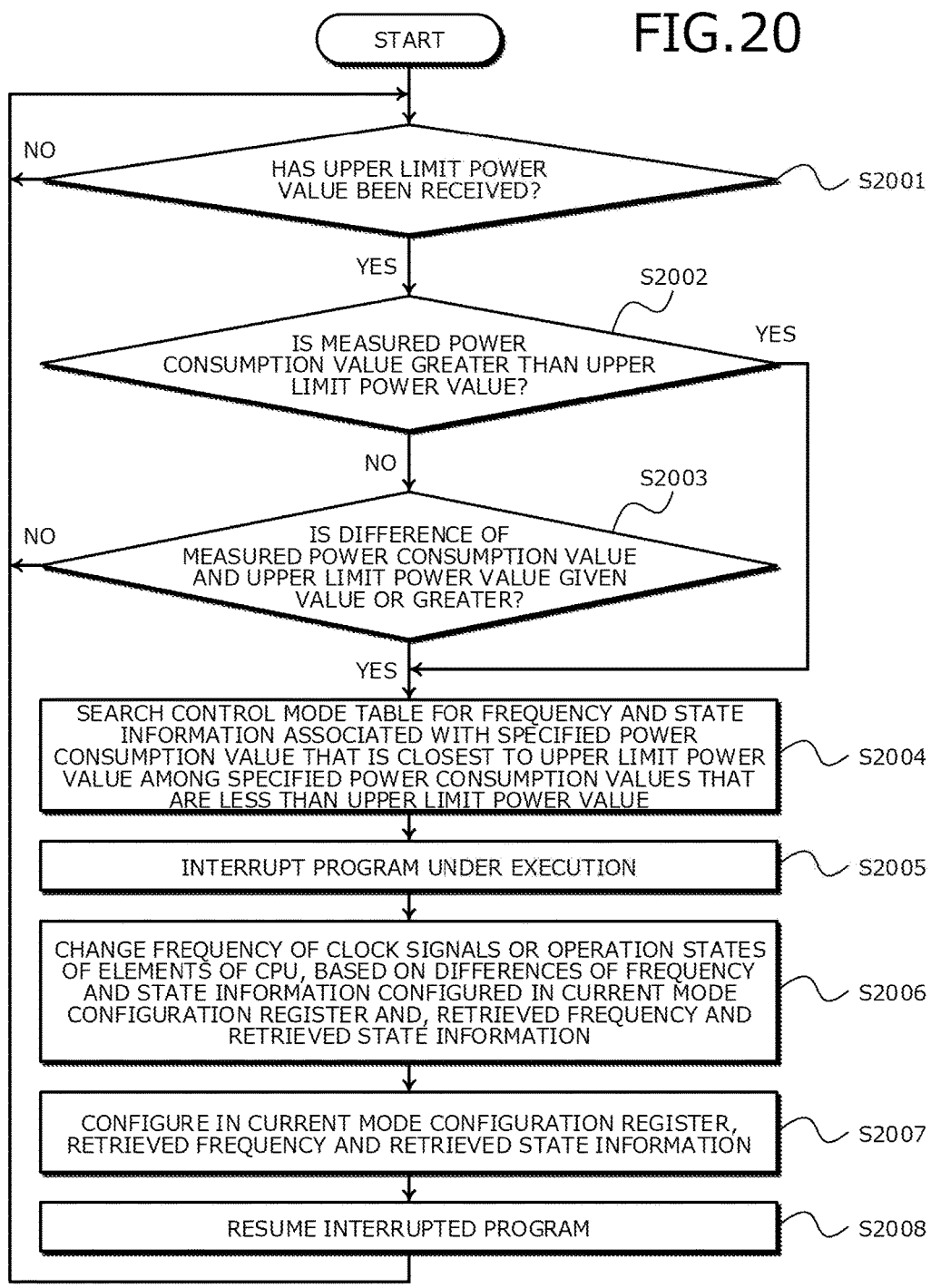
FIG. 20 is a flowchart of an example of a procedure of the selecting process by the CPU.

FIG. 20 is a flowchart of an example of a procedure of the selecting process by the CPU 101. The CPU 101 determines whether an upper limit power value has been received from the system management mechanism 1900 (step S2001). More specifically, the CPU 101 determines that an upper limit power value has been received when the value of the upper limit power value register 1911 has been updated. When determining that an upper limit power value has not been received (step S2001: NO), the CPU 101 returns to step S2001. When determining that an upper limit power value has been received (step S2001: YES), the CPU 101 determines whether the measured power consumption value is greater than the upper limit power value (step S2002). If the measured power consumption value is greater than the upper limit power value (step S2002: YES), the CPU 101 transitions to step S2004.

On the other hand, if the measured power consumption value is the upper limit power value or less (step S2002: NO), the CPU 101 determines if the difference of the measured power consumption value and the upper limit power value is a given value or greater (step S2003). As described above, the given value is the difference between the closest specified power consumption values. If the difference is not the given value or greater (step S2003: NO), the CPU 101 returns to step S2001.

On the other hand, if the difference is the given value or greater (step S2003: YES), the CPU 101 searches the control mode table 1000 for the frequency and the state information 601 associated with the specified power consumption value that is closest to the upper limit power value among specified power consumption values that are less than the upper limit power value (step S2004). The CPU 101 interrupts a program under execution (step S2005). The CPU 101 changes the frequency of the clock signals or the operation states of the elements of the CPU 101, based on the differences of the frequency and the state information 601 configured in the current mode configuration register 406 and, the retrieved frequency and the retrieved state information 601 (step S2006). The CPU 101 configures in the current mode configuration register 406, the retrieved frequency and the retrieved state information 601 (step S2007). The CPU 101 resumes the interrupted program (step S2008), and returns to step S2001.

As described, the selecting apparatus according to the first example, measures the processing performance value and power consumption value of the processor, for each operation state. The selecting apparatus, among plural given values, regards each as an upper limit and based on measurement results, specifies operation states for which processing performance is high. As a result, a processor can execute a program by operation states for which the processing performance is high and by which an upper limit condition of the power consumption value is satisfied.

The selecting apparatus, among plural predetermined power consumption values, regards each as an upper limit and specifies the operation state for which the processing performance indicated by the measured processing performance value is the highest. As a result, a processor can execute a program by an operation state for which the processing performance is high and by which an upper limit condition of the power consumption value is satisfied.

The selecting apparatus generates a control mode table that associates a specified power value that corresponds to a predetermined power consumption value, the operation state selected for the predetermined power consumption value, and the frequency at the time of measurement. As a result, a control mode table, which enables an operation state estimated to have the highest performance to be specified for each power value upper limit at the time of operation, can be automatically generated.

As described, the selecting apparatus according to the second example, measures for each operation state, the processing performance value and the power consumption value of a processor, and based on a rate of the respective specified power consumption values and the measured power consumption value, corrects the measured processing performance value. The selecting apparatus selects the operation state for which the corrected processing performance value is the highest. The selecting apparatus according to the second example further corrects the frequency at the time of measurement by this rate. As a result, even when the number of records of the state information is low, the state information by which the processing performance indicated by the processing performance value in a case where the power consumption value becomes the specified power consumption power consequent to a changing of the clock signal frequency can be selected. Therefore, at the time of operation, an operation state can be switched to for which the processing performance is high and an upper limit power consumption condition is satisfied.

The selecting apparatus selects the operation state for which the processing performance indicated by the corrected processing performance value is the highest. As a result, a processor can execute a program by an operation state for which the processing performance is high and an upper limit condition of the power consumption value is satisfied.

A CPU that can change the operation states of elements, at the time of operation, uses a control mode table generated by the selecting apparatus and searches for an operation state associated with a specified power consumption value that is closest to an upper limit power value among specified power consumption values that are an upper limit power value or less. As a result, during operation, an operation state for which the processing performance is high and by which an upper limit condition of the power consumption value is satisfied can be switched to. Therefore, lower power consumption of the CPU is facilitated while processing performance can be improved.

Further, the CPU does not change the operation state when the current measured power consumption value is a received upper limit power value or less. As a result, when the operation state yields high processing performance, the operation state is not changed and therefore, a program under execution can be prevented from being interrupted to change the operation state.

The CPU changes the operation state using the control mode table, when the current measured power consumption value is the received upper limit power value or less and the difference of the current measured power consumption value and the received upper limit power value is greater than the difference between the closest specified power consumption values. As a result, during operation, the operation state can be changed to an operation state that has the highest performance among operation states by which the measured power consumption value becomes less than the power value upper limit.

The selecting method described in the present embodiment may be implemented by executing the prepared selecting program on a computer such as a personal computer and a workstation. The selecting program is stored on a non-transitory, computer-readable recording medium such as a magnetic disk, an optical disk, a universal serial bus (USB) flash memory, etc. and executed by the computer. The selecting program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A selecting method comprising:
   obtaining by a computer, for each operation state combination for a processor of which element operation states are changeable, a state information record that indicates operation states of the operation state combination;
   measuring by the computer, for each obtained state information record, a power consumption value and a processing performance value of the processor after the processor is switched to the operation states indicated by the state information record, the power consumption value and the processing performance value being measured by executing a specific program on the processor after the processor is switched to the operation states indicated by the state information record; and selecting by the computer, based on the measured processing performance values and for each predetermined power consumption value among a plurality of predetermined power consumption values that differ, a state information record for which the measured power consumption value is the predetermined power consumption value or less among the obtained state information records.

2. The selecting method according to claim 1, wherein the selecting of the state information record includes selecting a state information record indicating operation states for which processing performance indicated by the measured processing performance value is highest among state information records for which the measured power consumption value is the predetermined power consumption value or less.

3. The selecting method according to claim 1 and further comprising generating by the computer, a table that associates a specified power consumption value that corresponds to a predetermined power consumption value, and the state information record selected for the predetermined power consumption value that corresponds to the specified power consumption value.

4. The selecting method according to claim 3 and further comprising:

receiving by the processor, an upper limit value for the power consumption value;

searching by the processor, the generated table for a state information record associated with the specified power consumption value closest to the received upper limit value among the state information records associated with a specified power consumption value that is less than the received upper limit value; and switching by the processor, to the operation states indicated by the retrieved state information record.

5. The selecting method according to claim 4 and further comprising measuring by the processor, a current power consumption value, wherein the searching for the state information record includes searching the generated table for a state information record that indicates operation states different from current operation states of the processor among the state information records associated with a specified power consumption value that is less than the received upper limit value, when the measured current power consumption value is greater than the received upper limit value.

6. The selecting method according to claim 5 and further comprising measuring by the processor, the current power consumption value, wherein the searching for the state information record state information includes searching the generated table for the state information record that indicates operation states different from the current operation states of the processor among the state information records associated with a specified power consumption value that is less than the received upper limit value, when the measured current power consumption value is the received upper limit value or less and a difference of the measured current power consumption value and the received upper limit value is a given value or greater, and includes refraining from searching when the measured current power consumption value is the received upper limit value or less and the difference of the measured current power consumption value and the received upper limit value is less than the given value.

7. A selecting method comprising:

obtaining by a computer, for each operation state combination for a processor of which element operation states are changeable, a state information record that indicates operation states of the operation state combination;

measuring by the computer, for each obtained state information record, a power consumption value and a processing performance value of the processor after the processor is switched to the operation states indicated by the state information record, the power consumption value and the processing performance value being measured by executing a specific program on the processor after the processor is switched to the operation states indicated by the state information record; and selecting by the computer, for each specified power consumption value among a plurality of specified power consumption values that differ, a state information record among the obtained state information records, the state information record being selected based on the measured processing performance value corrected based on a rate of the measured power consumption value and the specified power consumption value.

8. The selecting method according to claim 7, wherein the selecting of the state information record includes selecting a state information record indicating operation states for which processing performance indicated by the corrected processing performance value is highest.

9. The selecting method according to claim 7 and further comprising correcting by the computer, a frequency specified when the power consumption value and the processing performance value are measured, the specified frequency being corrected for each specified power consumption value and based on the rate concerning the selected state information record.

10. The selecting method according to claim 7 and further comprising generating by the computer, a table that associates a specified power consumption value, the state information record selected for the specified power consumption value, and a frequency corrected for the specified power consumption value.

11. The selecting method according to claim 10 and further comprising:

receiving by the processor, an upper limit value for the power consumption value;

searching by the processor, the generated table for a state information record and a frequency associated with the specified power consumption value closest to the received upper limit value among state information records and frequencies associated with a specified power consumption value that is less than the received upper limit value; and switching by the processor, to the operation states indicated by the retrieved state information record and changing a frequency of the processor to the retrieved frequency.

12. The selecting method according to claim 11 and further comprising measuring by the processor, a current power consumption value, wherein the searching for the state information record and the frequency includes searching the generated table for a frequency and a state information record that indicates operation states different from current operation states of the processor among the state information records and the frequencies associated with a specified power consumption value that is less than the received upper limit value, when the measured current power consumption value is greater than the received upper limit value.

13. The selecting method according to claim 12 and further comprising measuring by the processor, the current power consumption value, wherein the searching for the state information and the frequency includes searching the generated table for the state record that indicates operation states different from the current operation states of the processor among the state information records associated with a specified power consumption value that is less than the received upper limit value, when the measured current power consumption value is the received upper limit value or less and a difference of the measured current power consumption value and the received upper limit value is a given value or greater, and includes refraining from searching when the measured current power consumption value is the received upper limit value or less and the difference of the measured current power consumption value and the received upper limit value is less than the given value.

14. A non-transitory, computer-readable recording medium storing therein a selecting program that causes a computer to execute a process comprising:

obtaining for each operation state combination for a processor of which element operation states are changeable, a state information record that indicates operation states of the operation state combination;

measuring for each obtained state information record, a power consumption value and a processing performance value of the processor after the processor is switched to the operation states indicated by the state information record, the power consumption value and the processing performance value being measured by executing a specific program on the processor after the processor is switched to the operation states indicated by the state information record; and selecting based on the measured processing performance values and for each predetermined power consumption value among a plurality of predetermined power consumption values that differ, a state information record for which the measured power consumption value is the predetermined power consumption value or less among the obtained state information records.

* * * * *